(12) United States Patent
Sansom et al.

(10) Patent No.: US 10,171,881 B2
(45) Date of Patent: Jan. 1, 2019

(54) BACKUP MODULE AND METHOD

(75) Inventors: Patrick Michael Sansom, London (GB); Ian James Valentine, London (GB)

(73) Assignee: MT Digital Media Limited (GB)

( * ) Notice: Subject to any disclaimer, the term of this patent is extended or adjusted under 35 U.S.C. 154(b) by 750 days.

(21) Appl. No.: 13/395,643

(22) PCT Filed: Sep. 3, 2010

(86) PCT No.: PCT/GB2010/051461
§ 371 (c)(1),
(2), (4) Date: Sep. 28, 2012

(87) PCT Pub. No.: WO2011/030131
PCT Pub. Date: Mar. 17, 2011

(65) Prior Publication Data
US 2013/0047083 A1  Feb. 21, 2013

(30) Foreign Application Priority Data

Sep. 10, 2009 (GB) .................................. 0915885.8
Sep. 10, 2009 (GB) .................................. 0915886.6
(Continued)

(51) Int. Cl.
*G06F 17/30* (2006.01)
*H04L 29/06* (2006.01)
(Continued)

(52) U.S. Cl.
CPC ..... *H04N 21/4821* (2013.01); *G06F 17/3082* (2013.01); *G06F 17/30828* (2013.01);
(Continued)

(58) Field of Classification Search
CPC .... H04H 60/31; H04N 21/4821; H04N 21/84; H04N 21/485; H04N 21/4725;
(Continued)

(56) References Cited

U.S. PATENT DOCUMENTS 6,163,316 A    12/2000  Killian
6,312,336 B1   11/2001  Handelman et al.
(Continued)

FOREIGN PATENT DOCUMENTS

CN    1783020      7/2006
CN    101216837    7/2008
(Continued)

OTHER PUBLICATIONS

International Search Report dated Jan. 24, 2011 in corresponding PCT/GB10/051461.

*Primary Examiner* — Jorge A Casanova
(74) *Attorney, Agent, or Firm* — Pillsbury Winthrop Shaw Pittman LLP

(57) ABSTRACT

The present invention relates to a backup module operative for a content item delivery system. The backup module is configured to identify a series of user invoked interruptions. Each user invoked interruption comprises a transition between the display of a first content item and the display of a second content item prior to completion of the first content item. The backup module stores interruption records each including a locator to the first content item subject to a corresponding user invoked interruption; and initiates display of a first content item based on an interruption record corresponding to the first content item responsive to a backup signal.

16 Claims, 15 Drawing Sheets

(30) Foreign Application Priority Data

Sep. 10, 2009 (GB) .................................. 0915887.4
Jul. 29, 2010 (GB) .................................. 1012754.6
Jul. 29, 2010 (GB) .................................. 1012755.3
Jul. 29, 2010 (GB) .................................. 1012756.1
Jul. 29, 2010 (GB) .................................. 1012757.9

(51) Int. Cl.
| | | |
|---|---|---|
| H04N 21/436 | (2011.01) | |
| H04N 21/462 | (2011.01) | |
| H04N 21/4722 | (2011.01) | |
| H04N 21/4725 | (2011.01) | |
| H04N 21/482 | (2011.01) | |
| H04N 21/485 | (2011.01) | |
| H04N 21/84 | (2011.01) | |
| H04N 21/858 | (2011.01) | |
| H04N 7/173 | (2011.01) | |

(52) U.S. Cl.
CPC ...... *H04L 65/1059* (2013.01); *H04L 65/4084* (2013.01); *H04N 7/17318* (2013.01); *H04N 21/43615* (2013.01); *H04N 21/4622* (2013.01); *H04N 21/4722* (2013.01); *H04N 21/4725* (2013.01); *H04N 21/485* (2013.01); *H04N 21/4828* (2013.01); *H04N 21/84* (2013.01); *H04N 21/8586* (2013.01); *H04L 65/4069* (2013.01)

(58) Field of Classification Search
CPC ........... H04N 21/8586; H04N 21/4828; H04N 21/4622; H04N 21/43615; H04N 7/17318; H04N 21/4722; H04L 65/1059; H04L 65/4084; H04L 65/4069; G06F 17/3082; G06F 17/30828
USPC .................. 386/E5.043, 239, 244, 245, 262
See application file for complete search history.

(56) References Cited

U.S. PATENT DOCUMENTS

| | | | |
|---|---|---|---|
| 6,725,460 B1 | 4/2004 | Nishiyama et al. | |
| 6,910,191 B2 | 6/2005 | Segerberg et al. | |
| 7,134,132 B1 | 11/2006 | Ngo et al. | |
| 7,694,321 B1 | 4/2010 | Neil et al. | |
| 8,209,713 B1 | 6/2012 | Lai et al. | |
| 8,239,889 B2 | 8/2012 | Wong et al. | |
| 8,281,255 B2 | 10/2012 | Kidd | |
| 8,352,983 B1 | 1/2013 | Chane et al. | |
| 8,413,183 B2 | 4/2013 | Kunkel et al. | |
| 8,687,128 B2* | 4/2014 | Stahulak et al. | ............. 348/734 |
| 2002/0060750 A1 | 5/2002 | Istvan et al. | |
| 2002/0156702 A1 | 10/2002 | Kane | |
| 2002/0178444 A1* | 11/2002 | Trajkovic et al. | ............. 725/32 |
| 2003/0001898 A1 | 1/2003 | Bernhardson | |
| 2003/0115595 A1 | 6/2003 | Stevens et al. | |
| 2003/0221093 A1 | 11/2003 | Touchet | |
| 2004/0158858 A1 | 8/2004 | Paxton et al. | |
| 2004/0189873 A1 | 9/2004 | Konig et al. | |
| 2004/0221310 A1 | 11/2004 | Herrington et al. | |
| 2005/0044260 A1 | 2/2005 | Abramson et al. | |
| 2005/0120368 A1 | 6/2005 | Goronzy et al. | |
| 2005/0135793 A1 | 6/2005 | Mindrum | |
| 2005/0273828 A1 | 12/2005 | Barton | |
| 2005/0278741 A1 | 12/2005 | Robarts et al. | |
| 2006/0031892 A1 | 2/2006 | Cohen | |
| 2006/0048184 A1 | 3/2006 | Poslinski et al. | |
| 2006/0075444 A1 | 4/2006 | Dillen | |
| 2006/0143665 A1 | 6/2006 | Meek et al. | |
| 2006/0218589 A1 | 9/2006 | Wang et al. | |
| 2007/0006262 A1 | 1/2007 | Cleron et al. | |
| 2007/0074243 A1 | 3/2007 | Verhaegh et al. | |
| 2007/0101374 A1 | 5/2007 | Sherman et al. | |
| 2007/0169148 A1 | 7/2007 | Oddo et al. | |
| 2007/0188655 A1 | 8/2007 | Ohta | |
| 2008/0005068 A1 | 1/2008 | Dumais | |
| 2008/0022310 A1 | 1/2008 | Polling et al. | |
| 2008/0060027 A1* | 3/2008 | Yang | ............. 725/88 |
| 2008/0086688 A1 | 4/2008 | Chandratillake et al. | |
| 2008/0092159 A1 | 4/2008 | Dmitriev et al. | |
| 2008/0152300 A1* | 6/2008 | Knee | ............. G11B 27/005 386/250 |
| 2008/0154889 A1 | 6/2008 | Pfeiffer | |
| 2008/0181575 A1 | 7/2008 | Girard et al. | |
| 2008/0229353 A1 | 9/2008 | Morris et al. | |
| 2008/0297669 A1 | 12/2008 | Zalewski et al. | |
| 2008/0307456 A1 | 12/2008 | Beetcher et al. | |
| 2009/0037279 A1 | 2/2009 | Chockalingam et al. | |
| 2009/0172544 A1 | 7/2009 | Tsui et al. | |
| 2009/0178000 A1 | 7/2009 | Kwon et al. | |
| 2009/0210899 A1 | 8/2009 | Lawrence-Apfelbaum et al. | |
| 2009/0222850 A1 | 9/2009 | Darnell | |
| 2010/0070523 A1 | 3/2010 | Delgo et al. | |
| 2010/0083316 A1 | 4/2010 | Togashi et al. | |
| 2010/0211982 A1 | 8/2010 | Lee et al. | |
| 2010/0238924 A1 | 9/2010 | Liu | |
| 2010/0257569 A1 | 10/2010 | O'Hanlon | |
| 2011/0010738 A1 | 1/2011 | Carlsgaard et al. | |
| 2011/0219400 A1 | 9/2011 | Candelore et al. | |
| 2012/0284134 A1 | 11/2012 | Monahan | |
| 2014/0109143 A1* | 4/2014 | Craner | ............. H04N 21/4826 725/46 |

FOREIGN PATENT DOCUMENTS

| | | |
|---|---|---|
| CN | 101453622 | 6/2009 |
| EP | 1357734 | 10/2003 |
| EP | 1482735 | 12/2004 |
| EP | 1531626 | 5/2005 |
| EP | 1594317 | 11/2005 |
| EP | 1594317 A1 * | 11/2005 |
| EP | 1819159 | 8/2007 |
| EP | 2001223 | 12/2008 |
| EP | 2164247 | 3/2010 |
| EP | 1487212 | 8/2011 |
| GB | 2424747 | 4/2006 |
| GB | 2452519 | 11/2009 |
| JP | 2008-124651 | 5/2009 |
| WO | WO 2000/78040 | 12/2000 |
| WO | WO 2001/24047 | 5/2001 |
| WO | WO 2002/39289 | 5/2002 |
| WO | WO 2003/42866 | 5/2003 |
| WO | WO 2004/091187 | 10/2004 |
| WO | WO 2005/026869 | 3/2005 |
| WO | WO 2006/66375 | 6/2006 |
| WO | WO 2007/149754 | 12/2007 |
| WO | WO 2008/007274 | 1/2008 |
| WO | WO 2008/070133 | 6/2008 |
| WO | WO 2008/088510 | 7/2008 |
| WO | WO 2009/117009 | 9/2009 |

* cited by examiner

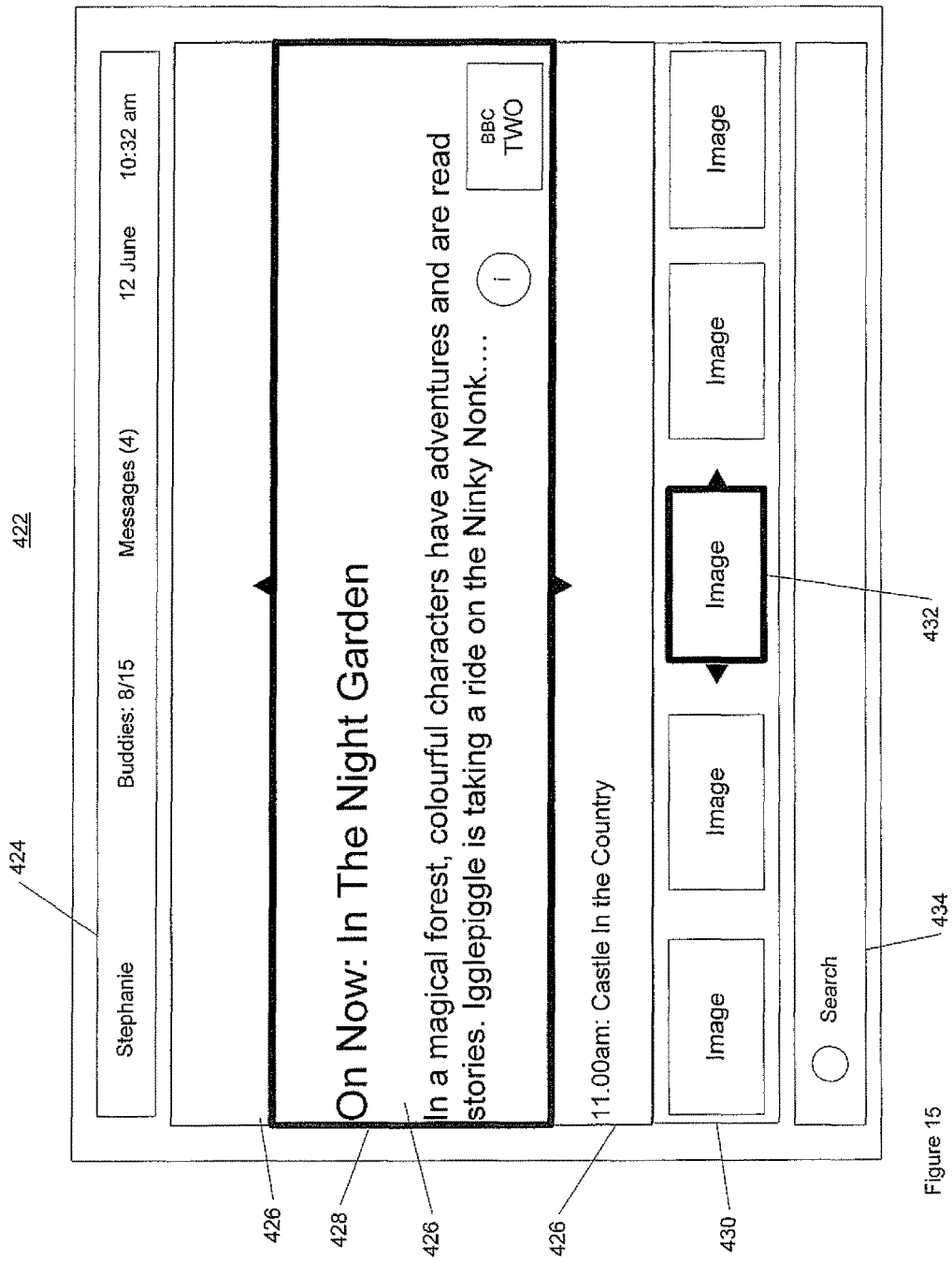

BACKUP MODULE AND METHOD

CROSS-REFERENCE TO RELATED APPLICATIONS

The present application is the U.S. National Stage Application (filed under 35 U.S.C. 371) of prior International Application No. PCT/GB2010/051461, filed Sep. 3, 2010, and published on Mar. 17, 2011 as WO 2011/030131, which claims priority to GB 0915885.8, GB 0915886.6, GB 0915887.4, all filed on Sep. 10, 2009, GB 1012757.9, GB 1012756.1, GB 1012755.3, and GB 1012754.6, all filed on Jul. 29, 2010, the contents of which are incorporated herein by reference in their entirety.

FIELD

The present invention relates to a backup module and method. In particular, but not exclusively, to a backup module and method for a content item delivery system.

BACKGROUND

The distribution of media content such as music and video now takes place over various communications channels. For example, music and video may be broadcast over terrestrial VHF and UHF networks to be received by television sets, from satellite to ground stations or domestic satellite receivers and over cable networks. Such broadcast services generally comprise one or more communication channels, each channel comprising a particular carrier frequency onto which is modulated a signal representative of the content to be transmitted over the channel. Content, typically television programmes, films or music shows, are transmitted over a particular channel or channels at particular times in accordance with a programme schedule. In this regard, broadcast services comprise "appointments to view" whereby a viewer has to tune into a channel at the time content of interest to the viewer is transmitted on that channel.

More recently, interactive television has become available whereby a viewer, prompted by a message displayed on the television, may send control signals or messages to the broadcaster or third party associated with the broadcaster and displayed message to initiate certain activity. For example, to initiate selection of a programme to view or receive information about a programme.

Broadcast services are widely available using digital communications techniques. Digital broadcast service providers often provide data to populate a menu or Electronic Programme Guide (EPG) of, for example, a set-top box or television with suitable EPG software, on one of their channels. A typical EPG is based on a grid system and displays programmes and channels in transverse directions. For example, the programmes for a particular channel may be displayed in a horizontal direction with different channels set out in a vertical direction. A viewer may use a remote control having "UP/DOWN" and "LEFT/RIGHT" buttons and use these buttons to move a cursor about the display to highlight programmes. A viewer may select a highlighted programme by actuating a "SELECT" button which tunes the receiver to the particular cannel. Optionally, a viewer may highlight a programme which is to be broadcast in the future and selection of that programme may invoke a "record" or "reminder" option.

Television viewers are generally familiar with EPGs set out in a grid system and navigable using remote control devices having relatively simple buttons such as "UP/DOWN" and "LEFT/RIGHT" buttons and "SELECT" buttons.

Content is also available over computer networks such as the Internet. Content is usually accessed over the Internet using a personal computer such as a desktop or laptop computer. The location of content on a network such as the Internet is defined by a network address known as a Uniform Resource Locator (URL). A particular content item can be addressed and downloaded to the computer addressing the content for later presentation or may be "streamed" whereby the computer presents the content as it is provided over the network. The user interface for a computer is generally a pointing device such as a "mouse", and computer users are familiar with a user interface which allows for the pointing device to be moved on to an icon, text (such as an Internet "link") or other graphic displayed on a display and selecting that graphic to invoke a function associated with the graphic, for example accessing content over the Internet.

Content is accessed over the Internet using a browser application, which amongst other functions provides the ability to go back to previous web pages or forward to web pages previously visited in the browser session by way of a simple "mouse click". Typically the "back" and "forward" directions are indicated by icons comprising opposing directed arrows. When either backing up or moving forward through previously visited web pages, each previously visited web page in the respective direction is displayed. Thus, regardless of whether or not a user has completely finished with a particular web page and no longer wishes to view it, the web page will nevertheless be displayed as the viewer "backs up" through their viewing history.

Many communications networks, including those making up at least a part of the Internet, are configured to transmit large amounts of data and these are sometime termed "broadband" networks. For the purpose of this description the term "broadband network" is used refer to a communications network or part thereof which is capable of transmitting content items such as video and music in an acceptable timeframe. Such networks may also support music or video streaming. The data bandwidth capability of a consumer connection to such a network is typically at least 2 MBit/s.

Many computer users have computers which are part of a local area network (LAN), for example in their workplace and increasingly at home in their domestic residence. Users often keep content items on memory storage coupled to their LAN and accessed through their computers.

Aspects and embodiments of the present invention were devised with the foregoing in mind.

Viewed from a first aspect there is provided a backup module operative for a content item delivery system, said configured to identify a series of user invoked interruptions, each interruption comprising a transition between the display of a first content item and the display of a second content item prior to completion of the display of said first content item. The backup module is also configured to store interruption records which each include a pointer to a first content item which has been interrupted by a user invoked interruption. The display of a first content item which has been interrupted is initiated in response to a backup signal and is based on a corresponding interruption record.

Viewed from a second aspect there is provided a method of operating data processing apparatus to back up a display of content items through a sequence of interrupted content items. The method comprises identifying a series of user invoked interruptions, each interruption comprising a transition between the display of a first content item and the display of a second content item prior to completion of said first content item. The method further comprises storing interruption records which each include a pointer the first content item subject to the user invoked interruption to which the interruption record relates, and initiating the display of a first content item based on the interruption record corresponding to that first content item in response to a backup signal.

In accordance with a third aspect and fourth aspect there is provided respectively a backup module operative for a content item delivery system and method, configured to identify a series of user invoked interruptions and store interruption records are set out above in relation to the first and second aspect respectively, and further to initiate display of one or more first content item identifiers corresponding to the interruption records in response to a backup signal. Embodiments in accordance with the third and fourth aspects may provide a list or menu for example, possibly similar to an electronic programme guide, content item identifiers corresponding to the content items which have been interrupted. A viewer may then go to a particular content item identifier and select it in order to return to viewing that particular content item.

Embodiments in accordance with the foregoing aspects provide an environment in which a viewer may back up through content items they have previously viewed at which they had not finished viewing, instead of having to back up through every single content item they had previously viewed.

Particular embodiments in accordance with the foregoing aspects may be implemented in a content item receiver such as a set-top box for a television display apparatus configured to provide broadband access as well as broadcast access, such as to a terrestrial, satellite or cable distribution network. Embodiments may also be implemented on a network platform such as a server configured to communicate with a set-top box or other such apparatus for providing content items for display on a television display apparatus. Embodiments may also be implemented such that aspects in accordance with the invention are distributed between a content item receiver and server, for example.

In general, a graphic item associated with a first content item which has been interrupted may be displayed in response to the backup signal, which may comprise a list of such items for embodiments in accordance with the third and fourth aspects. Restarting display of a particular first content item may be initiated in response to selecting the graphic item corresponding to the first content item is display is to be restarted.

Optionally or additionally, the graphic item may comprise a still image or a video clip so that a viewer may be reminded of the content item associated with a particular graphic item in order to assist them in selecting which content item to display.

Display of a content item may be restarted from the beginning of the content item, or may be resumed from a position in the content item at which the interruption occurred. Restarting or resumption may be at the option of the viewer or one or other may be set as a default.

In a particular embodiment, each interruption record records a position in the first content item corresponding to the transition away from displaying that first content item in response to the user invoked interruption. For example, the position may correspond to the position at which the corresponding transition occurred. Recording the position provides a mechanism by which the backup module may return display to where a viewer may wish to return. If the position corresponds to the transition point resuming display of the content item from where use interruption occurred is facilitated. Also, it may be possible to display to a user a long interrupted content item had been viewed, or how much of the content item is left to be viewed, based upon the position information.

Optionally or additionally, an embodiment may be configured to initiate display of the first content item from its beginning.

An embodiment may be further configured to initiate maintaining receiving the first content item and to initiate recording of the first content item in response to a user invoked interruption when the first content item is a broadcast content item. Continuing to receive a broadcast content item and to record it allows a viewer to return to a place in the broadcast item where the interruption occurred so that they can avoid missing part of the broadcast content item. This is particularly useful if the first content item was a live broadcast item such as a sports event.

Broadcast content items may include information concerning a broadcast item, for example a programme status information signal which may be used to determine a position in the first content item for recording in an interruption record. For example such programme status information signal is a commercial break information signal indicating the start or end of a commercial break. The backup module may be configured to return to a part of a broadcast content item in response to programme status information indicating an end of the commercial break, and the position recorded in the interruption record would reflect such information.

Optionally or additionally programme status information may indicate type of data that was present on the display prior to interruption, thereby providing a mechanism for the backup module to return a viewer to a point in a content item having content of a type similar to or the same as that present prior to the interruption. For example, a user may interrupt their viewing of the live broadcast of a football game at halftime in order to avoid viewing the studio chat. However, a viewer when returning to the football game having moved away from it is unlikely to want to return to the studio chat. By recording the type of content prior to the interruption the backup module may return a viewer to a part of the content item display a similar type of content, i.e. the start of the second half of the football game. In this way, a viewer is able to navigate and backup through their previous viewing selections while displaying only content items of interest.

Typically, the user invoked interruption may comprise a channel change signal or a request to view a broadband content item.

Storing the interruption records with a record of the order in which the interruption occurred, for example in a last in first out ordered stack, provides for an embodiment in which repeated activation of a backup signal may initiate display of interrupted first content items in the reverse order in which they were interrupted, thereby providing backup in a reversed chronological sequence to the order in which the first content items were interrupted.

While the above description relates to instances where content items are interrupted midstream, optionally or additionally one or more embodiments may be configured to provide this functionality when operating on lists of content items as well as (or instead of) the content items themselves, where the interruption occurs at or close to a content item transition in the list.

This may be useful for lists such as playlists, favourites and history, or even 3$^{rd}$ party content lists delivered as broadband TV channels. In this embodiment, the position in the list is an option to return to as well as positions in the content item itself. In this instance, the list itself if stored in the stack to enable return to a particular position in the list.

One or more embodiments of the present invention are described further hereinafter, by way of example only, with reference to the accompanying drawings in which:

FIG. 1 schematically illustrates components and communication links of a system for providing access to content from a plurality of sources in accordance with an embodiment of the invention;

FIG. 2 schematically illustrates the system of FIG. 1 in more detail;

FIG. 3 schematically illustrates a media display management server and components thereof in accordance with an embodiment of the invention;

FIG. 4 schematically illustrates a content receiver and components thereof in accordance with an embodiment of the invention;

FIG. 15 shows a screenshot of a screen displayed when a TV guide menu is invoked by a content receiver in response to instructions input thereto by a user.

A detailed description of one or more embodiments of the invention follows with reference to the figures provided.

Figure 1:
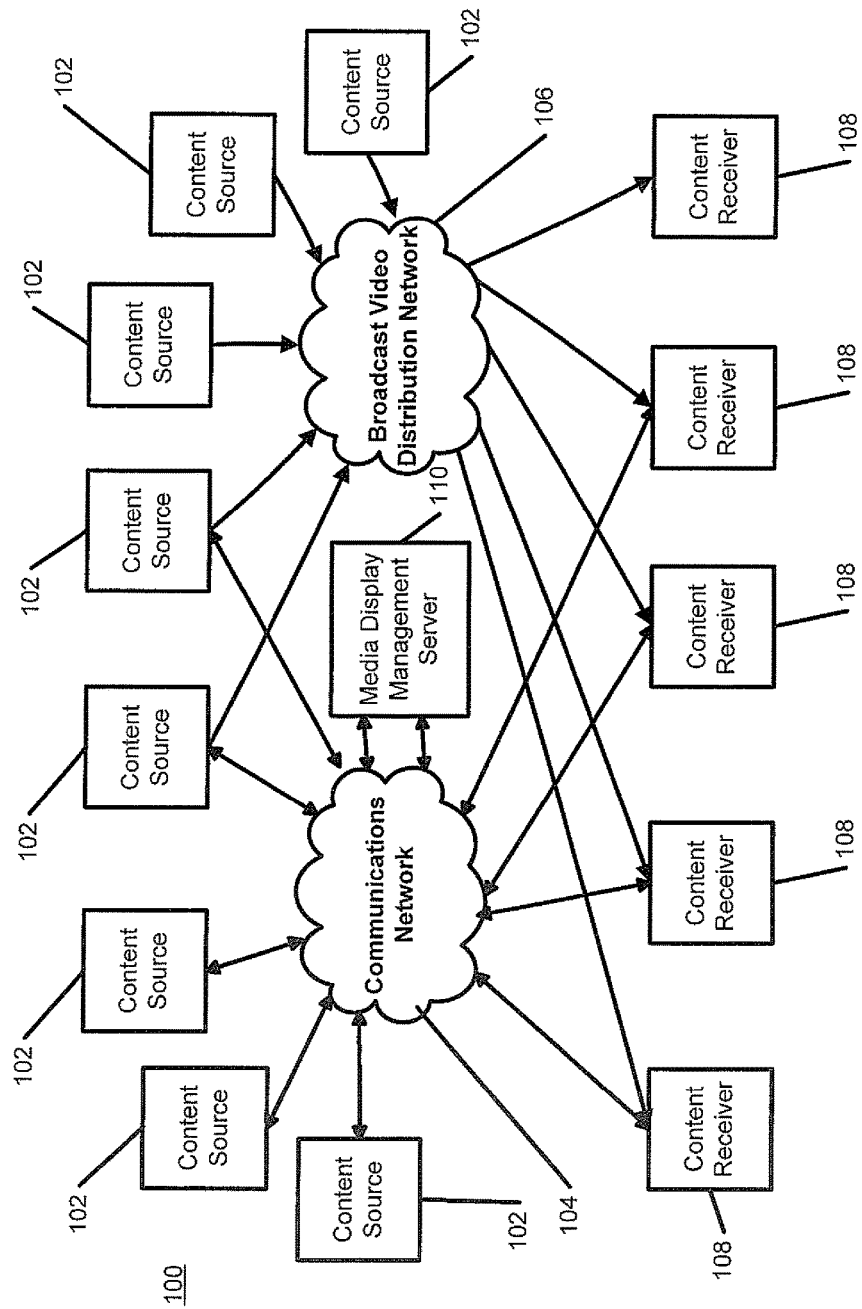

FIG. 1 schematically illustrates components and communication links of a system 100 for providing access to content from one or more content receivers to content from a plurality of sources. Content may comprise one or more content items, and a content item may be a part or whole of programming content (e.g. a television programme), a film, a video clip, an advertisement, and an interactive application, for example.

The system 100 comprises a plurality of content sources 102 arranged to provide content for reception by a plurality of content receivers 108 (e.g. set-top boxes) and subsequent viewing of the content on a display associated with the respective receivers 108 over at least one of a communications network 104 (such as: a wide area network (WAN), e.g. the Internet; local area networks (LAN); or a combination of two or more such networks) and a broadcast video distribution network 106 (e.g. a terrestrial cable IPTV or satellite television broadcast system). The system 100 also comprises a media display management server (MDMS) 110 which controls content configuration and distribution of content to the content receivers 108 and provides a content search and/or discovery and/or navigation module and other services. The MDMS 110 provides a content management environment responsible for the presentation of the content accessed by content receivers 108 (or users thereof) registered with the MDMS 110, giving users a consistent, quality controlled, user interface experience across multiple content types such as broadcast TV, interactive content, and Internet video content.

A media display management module (not shown) is provided in the content receivers 108 for managing the content search, discovery, navigation and presentation on the content receivers 108. The media display management module is configured to communicate with the MDMS 110 over the communications network 104.

The MDMS 110 and the media display management module configure content for display based upon a set of parameters specified by one or more of: a content provider; a user of a content receiver 108; a content receiver 108 manufacturer; and a service provider. The parameters may be embedded as operating parameters of a content receiver 108.

Figure 2:
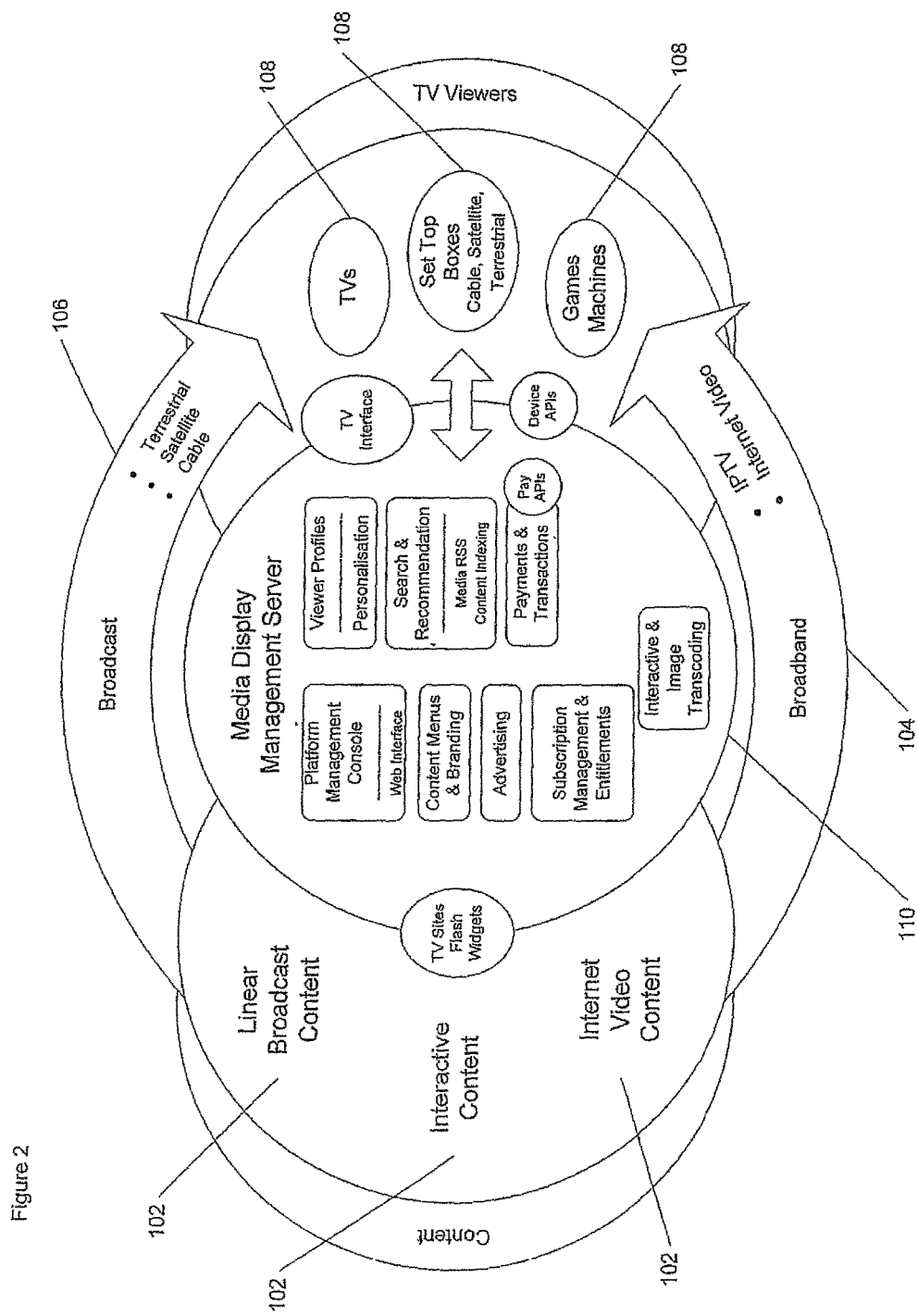

FIG. 2 schematically illustrates the features of FIG. 1 in more detail and provides an overview of the functional elements and modules of the MDMS 110. The features illustrated in FIG. 2 which correspond to features already described in relation to FIG. 1 are denoted by like reference numerals.

In the illustrated embodiment, the MDMS 110 offers a client-server relationship with content receivers 108 comprising TV devices (such as set-top boxes), or as a web service via device Application Programming Interfaces (APIs) to TV devices and other systems. Content receivers 108 comprising TV devices that connect to the MDMS 110 may have embedded in them a content receiver specific client (e.g. media display management module) that enables at least a portion of platform services of the MDMS 110 and content owner and original equipment manufacturer (OEM) branding, i.e. branding for the content receiver, manufacturer or supplier, to be maintained uniformly across device types. Once ported, code changes may not need to be made to the device software to add additional content, features and branding.

For content receivers 108 that connect to the MDMS 110 and which do not have embedded client software, the platform services and content can be enabled via direct services application program interfaces and a TV device user interface. In these instances, a sub-set of the full platform functionality may be used, and content owner and OEM configured branding and services may not be fully-reflected in the interface displayed to the user because of the limitations thereof. However, certain minimal elements may be required to be supported as a condition of utilising the APIs.

Internet video traffic delivered to TV devices does not pass through the MDMS 110, but utilises the direct streaming services, protocols, codecs and networking paths from the content owners to the TV devices. While these services, protocols, codecs and the networks utilised are common to Internet video streaming to PCs, TV receivers may only be capable of processing a subset of these protocols and codecs.

Likewise, broadcast content delivered to TV devices does not pass through the MDMS 110 either, but is subject to broadcasting protocols and transmission paths common to broadcast of TV signals to TV devices over suitable media (e.g. Satellite, Antenna, and Cable).

Using the MDMS 110, content owners and media aggregators (i.e. parties who aggregate syndicated web content such as news headlines, weblogs (blogs), podcasts, vlogs (video blogs) in a single proposition) can register and manage their services and content for discovery and use by content receivers 108 configured to receive content made available through the MDMS 110. Content owners can also configure additional products and services via the MDMS 110 such as content subscriptions and promotions and their content owner branding and interactive options are preserved across all devices wherever their content is displayed.

A content receiver user having content stored on their own local content domain may also be able to register and manage content stored on that local content domain using the MDMS 110, and for discovery and use using their content receiver. In this case, the content receiver user is effectively another content owner.

The MDMS 110 implements a range of functions, namely:

a. The registration of Internet video sources and libraries to enable the search, discovery, navigation and playing of content on multiple TV device types;

b. The registration of interactive destinations and TV applications to enable their search, discovery, navigation and access on multiple types of TV device;

c. The management of content branding, media searches, recommendations, interactive links and promotions for content owners (including advertising and sponsorships) such that the correct branding and facilities are displayed to the viewer whenever their content is being accessed, across multiple types of TV device—this capability is common to TV broadcasters, Internet video aggregators, and interactive application owners;

d. The registration of "users"—such as TV viewers, and the management of their personalisation information, such that a viewer's identity and personalisation information is available across multiple types of TV device;

e. The provision of a range of content discovery services, such as:
  i) Centralised search across all content;
  ii) Content recommendations and relationships;
  iii) Content sharing between community members;
  iv) Content promotion for content owners;
  v) Resolution of TV Keys™
  vi) Management of content item lists
  vii) Messaging f. The implementation of distribution arrangements and rights restrictions for content owners, particularly the enforcement of territory rights restrictions;

g. Centralised subscription payments services and micro billing (billing for individual content items) for all content owners;

h. Advertising services which may comprise a range of products, for example:
  i) "click through" advertising links to video or interactive destinations;
  ii) Insertion of video advertising in playlists and video content consumption;
  iii) Interfacing to standard $3^{rd}$ party Internet ad serving infrastructures and campaign management and sales facilities; and
  iv) The provision of viewer targeting data to $3^{rd}$ party ad serving engines.

Figure 3:
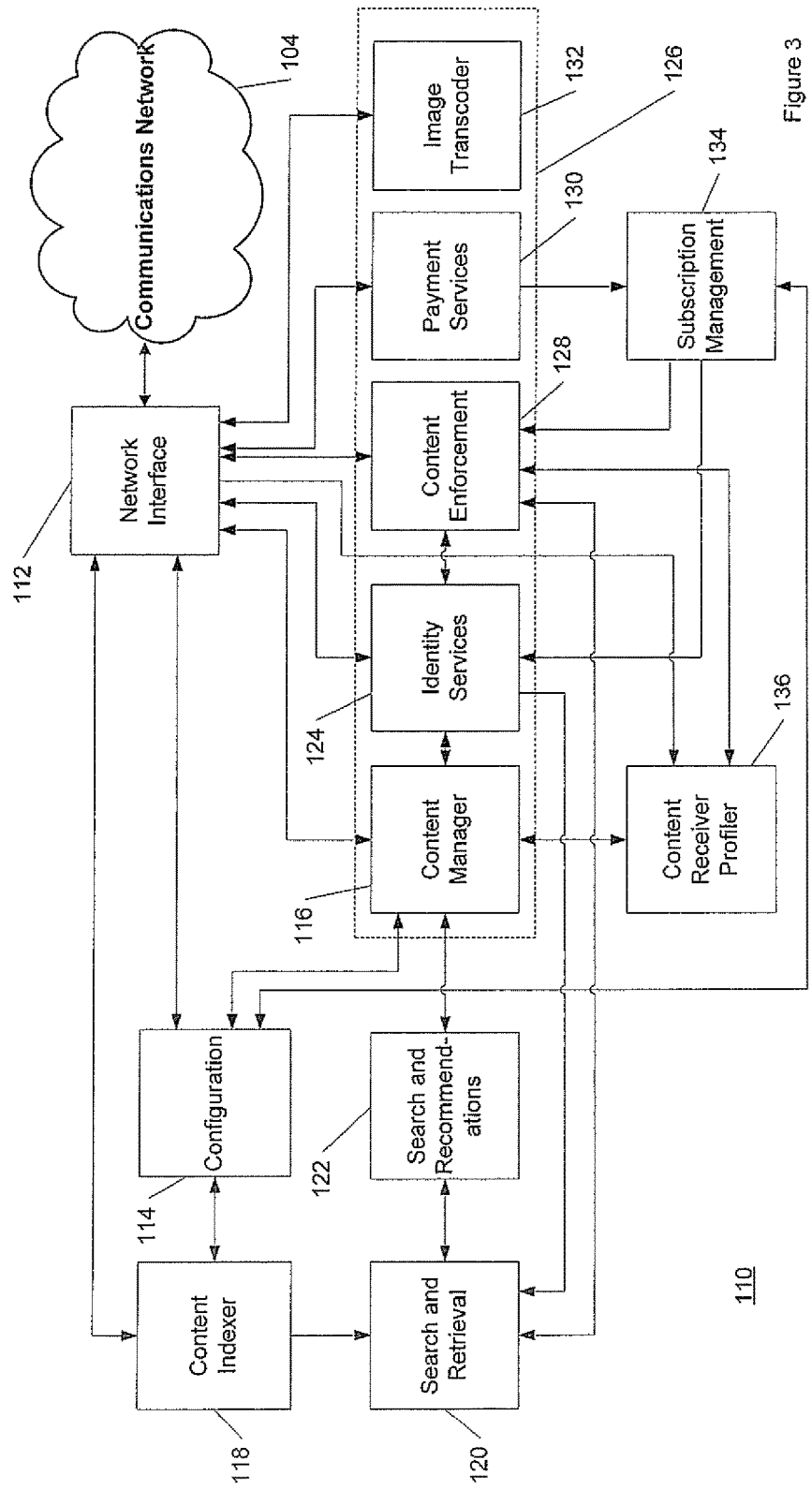

FIG. 3 schematically illustrates the MDMS 110 and components thereof according to one or more embodiments of the present invention.

The MDMS 110 includes a network interface 112 providing a route through which the MDMS 110 is coupled to the communications network 104. The MDMS 110 communicates with the content sources and content receivers over the communications network 104 via the network interface 112. Information received at the MDMS 110 from the content sources may include, for example, content metadata to feed a search and retrieval module (e.g. Web feeds such as RSS XML feeds), content owner branding data for application content to be displayed, other content owner rules relating to display and consumption of their content.

A configuration module 114 of the MDMS 110 is configured to provide a means for content owners to register and manage their content. The configuration module 114 comprises a processor and a data storage module.

The configuration module 114 also provides a means by which content receiver manufacturers, i.e. OEM manufacturers, can specify how data and information should be displayed when the system of the invention is implemented using their specific content receivers. An identity services module 124 (described in more detail later) provides a means by which end-users' (i.e. viewers using a content receiver implementing the system of the present invention) presentation preferences describing how data and information should be displayed on their content receivers are stored, e.g. personalising how menus appear when displayed via their content receivers.

A content manager 116 (described in more detail later) is operative to combine the configurations and preferences specified by the above three different parties.

When initially registering their content with the MDMS 110 to make such content available to viewers having content receivers configured to receive such content via the MDMS 110, content owners conduct a set-up process using the configuration module 114. This set-up process may be conducted by the content owner, perhaps at a remote location, by way of a content owner terminal, for example, a PC, arranged to communicate with the configuration module 114 via the communications network 104 and network interface 112.

In an example, the content owner could use the PC to navigate to a specific web-page to initiate the set-up process. The configuration module 114, upon receiving a request for the web-page data from the PC, transmits the relevant web-page data to the PC of the content owner to allow the content owner to conduct the set-up process. The content owner is presented with a content owner interface which displays a number of functions relating to how it wishes to configure its content. In this regard, the content owner can define:

Its MediaRSS (or other format) feeds and associated parameters that will be retrieved by the content indexer 118. This is so that the content owner's content items can be presented to a user in search results and recommendations when they are relevant to the search or recommendation being performed by the MDMS 110.

Content item presentation information such as their branding

The categories of content they support e.g. general video, news etc.

Content subscription packages and pricing and the rules used to identify the content items that belong to each subscription package.

Distribution arrangements such as the OEMs or service providers (collectively termed operators) on whose content receivers their content is to be made available and/or in which territories their content can be made available.

The content owner may also wish to configure a content menu application to be made available to the viewer when the viewer is consuming content from that content owner. Again, this content menu registration option may be specified during the initial set-up process or at a later time. The content menu registration option also provides the content owner with the ability to configure specific menu items which access services of the MDMS such as: a search application which allows a viewer to search only within content of that content owner; a content recommendations application which provides a viewer with recommendations from the content of that content owner; quasi-channel applications in which themed content from that content owner is arranged into such quasi-channels either statically or dynamically using pre-defined searches and recommendations which can then be performed without data input from the end viewer; and an advertising application whereby space on the content menu of that content owner can be sold for advertising or can be used to promote specific content from that content owner with the ability to click through the advertising to a piece of content or an interactive destination.

The content owner indicates that the content is configured as they require it to be using the content owner interface of the web-page displayed at their terminal and, upon such indication; the terminal transmits this configuration parameters data via the communications network 104 and network interface 112 to the configuration module 114. Upon receipt of the data, the configuration module 114 sends a confirmation to the content owner terminal that the configuration parameters data has been received and stores the configuration parameters data within its data storage module.

Although described from the viewpoint of a content owner specifying their requirements, a service provider and/or an OEM could specify their own branding and presentation requirements and menus using the same interface, though the options available for configuration may be different for these different roles.

The data storage module of the configuration module 114 is configured to maintain a database of the content configuration parameters data for retrieval by a content manager 116 which can subsequently apply the content configuration parameters data to content to be transmitted to content receivers.

The MDMS 110 is arranged to retrieve the content metadata configured by the content owners to enable the provision of content search and recommendations to content receivers. The content metadata is retrieved over the communications network by the content indexer 118, optionally as a media RSS XML feed. The content indexer 118 retrieves the content owner feed configurations from the content owner configuration 114, retrieving and processing the content owner feeds as specified. The content indexer 118 augments the metadata retrieved from the content owner with derived data using MDMS rules (such as the appropriate MDMS quality classification and the protocols and codecs implied by the one or more content references) and data derived using the relevant content owner configuration retrieved from the content owner configuration 114 (such as the presentation information, distribution networks and territories and the subscription packages that each content item is associated). The XML metadata for each content item is then passed to a search and retrieval module 120 which indexes and stores the content metadata data in its associated storage.

The received content metadata includes data (e.g. a URL) identifying a location at the content source of the actual content instances to which it relates (with each content instance being associated with a different protocol/codec/bandwidth combination) and thus the search and retrieval module 120 maintains a list of content references for each content item registered by content owners.

A search and recommendations module 122 is arranged as an access layer to the search and retrieval module 120. This exposes a straightforward XML based services API to the content manager 116 for each of the service requests the content manager 116 requires and implements each of these requests utilising one or more of the proprietary APIs and services provided by the search and retrieval module 120.

The MDMS 110 further comprises an identity services module 124 comprising a processor and a user identity storage module. The user identity storage module of the identity services module 124 is configured to store data relating to identities corresponding to different users of a content receiver, e.g. an identity for each individual member of a household. This module provides a user profile data model to be associated with the identities which may comprise:

nickname personal details including a unique mobile number and/or email address viewing and content preferences including PIN protection settings content receivers that this profile is associated with purchased subscriptions and content items content item history content item ratings content item bookmarks and playlist tags Various user actions on the content receiver initiate communication with the identity service module 124 some of which result in the current user's profile being updated by the identity services module 124. Examples of these communications include: editing and saving user details and preferences, viewing bookmarks, bookmarking a content item, rating a content item, viewing a content item etc. A default identity of a content receiver may be tied to a unique identifier of the content receiver itself which is used when no individual identity has been identified. This default identity may be associated with the subscriber details where the content receiver has been provisioned by a service provider.

With this arrangement, profile information of users (including, for example, feedback from their consumption of content) can be used to improve targeting and particularly recommendations of content to specific users. This is achieved by the identity services module 124 creating user profiles in the search and retrieval module 120 and populating these with the content items consumed by each user profile. The search and retrieval module can then make consumption informed user recommendations when requested by the search and recommendations module 122.

In response to reception at the MDMS 110 of an instruction from a content receiver to switch user (such instruction invoked by a user action in relation to the content receiver, i.e. selection of a user associated with the content receiver and optionally the entering of a personal identification number (PIN) code, e.g. via a remote control), the instruction, user identifier, receiver identifier and optional PIN are delivered to the identity services module 124 via network interface 112. The identity services module 124 retrieves the relevant user's profile data from its storage module, checks the PIN if required and, if successful, records the new user as the current user for this content receiver in its storage module and generates and returns to the content receiver the user menu appropriate for this user on this content receiver. This new user menu may result in additional requests from the content receiver to the content manager 116 to populate content items (such as the user content recommendations).

When a user of a content receiver wishes to search for specific content and initiates a search via their content receiver to search for such specific content, a search request is received by the network interface 112 via the communications network 104 for the content receiver and delivered to the content manager 116. The content manager 116 then constructs the search query adding a number of additional constraints to the search that are derived from the capabilities and attributes of the content receiver. In particular the content receiver may provide the content receiver identifier, type and operator as part of the search request and the source IP address can be determined from the TCP/IP networking protocols. These are passed to the content receiver profiler 136 which determines and returns:

- The protocols and codecs supported by this type of content receiver. This data is configured and stored for each type of content receiver in the content receiver profiler 136. The dataset for this type of content receiver is retrieved from this store.
- The operator associated with this content receiver.
- The bandwidth capability of this content receiver's network. This bandwidth would have been submitted to the content receiver profiler 136 by the content receiver during an earlier bandwidth test, typically performed on booting the content receiver and stored by the content receiver profiler against the content receiver identifier.
- The determined territory of the content receiver. This is derived from the source IP of the content receiver using an IP to geographical location (in this instance, territory) mapping table.

The content manager 116 then instructs the search and recommendations module 122 to execute the constructed search query. The search and recommendations module 122 extracts the search parameter data from the request in order to address the specific interface of the search and retrieval module 120. The search is then performed by the search and retrieval module 120 as instructed by the search and recommendations module 122 and the metadata of the relevant content items is retrieved and returned to the content manager 116. These search results are then transmitted to the content receiver from which the search request was received.

The effect of the combination of this constrained search query implemented by the content manager 116 against the content metadata augmented by the content indexer 118 is to ensure that only content appropriate for and functional on the content receiver is presented to the user. This process applies to recommendations and other content requests.

When a user of a content receiver instigates a search, any content results returned to the user may optionally be tailored for that user based upon the user's profile. Thus, in this case, the content manager 116, upon receipt of a content request via the network interface 112 adds further constraints to the search query. First it requests the user profile data related to the current user who requested the search to the identity services module 124. The identity services module 124 retrieves the user profile data and returns this to the content manager 116. The content manager 116 amends the search request data to include any relevant profile settings (such as safe search i.e. no adult content) as additional terms in the search query prior to submitting the query to the search and recommendations module 122. Upon reception of such amended search request data, the search and recommendations module 122 proceeds in the manner described above to retrieve the metadata of content items relevant to the search request and these search results are returned to the content manager 116. In addition the content manager 116 may augment the content item metadata returned with relevant user specific metadata such as the user's rating, any user tags, whether or not the user is already entitled to view the content as part of one of their active subscription packages etc. before transmitting the content metadata to the user's content receiver. Thus a personalised form of content presentation can be delivered to the user while still maintaining the requirements and constraints of other parties (i.e. content owner, etc.).

In some instances a further variation of the above scheme may be utilised, particularly when a user has knowledge of the content items being displayed (such as their bookmarked content items), where content items that are not functional on the device are still returned in the results but have their content item metadata further augmented to indicate that they are non-functional content items. This avoids the user thinking that the system has lost content items that they are aware of if they move between content receivers with different capabilities.

The MDMS 110 offers a range of functions to a user of a content receiver which might include, for example: video search and recommendations; interacting with content provider menus; registering new profiles (individual identities); administering payment instruments and billing, transactions and payments authorisation; managing favourites, playlists and history; interacting with messages and other users; and setting up user preferences and options.

A display format for display of the content owner specified and/or personalised form of content on a display screen is delivered to a content receiver from the content manager 116 via network interface 112 and communications network 104. This display format is controlled by the content manager 116 based upon the content configuration parameters data stored in the data storage module of the configuration module 114 and/or the user profile data stored for the current user in the storage module of the identity services 124

The display format is delivered in markup which describes how to display the required functionality of the user interface either via a graphical menu on the TV screen or via a browser application on the content receiver or a third party interactive TV engine.

Communication between the content receiver 108 and MDMS 110 takes place via the content receiver services module 126 which is arranged to service requests from the content receiver 108, enforce security and access controls for protected premium content and may compile XML content responses into a binary representation of XML for efficient communications and processing on the content receiver.

The content receiver services module 126 comprises the following modules: content manager 116 (as hereinbefore described); identity services module 124 (also hereinbefore described); content enforcement module 128; payment services module 130; and image transcoder 132.

The content enforcement module 128 is the element of the content receiver services module 126 configured to gate and authorise the playing of protected (e.g. premium or restricted) content. The content enforcement module 128 operates in conjunction with a payment services module 130, subscription management module 134, the identity services 124 and the content receiver profiler. Such enforcement is implemented by checking territory restrictions, subscription entitlements, informing the user of any gating actions required (e.g. PIN entry required, purchase required, etc.) and requesting authorised content URLs from content owners to provide a content receiver access to a content item. In this regard, a request for a content URL is sent from the content receiver and received at the MDMS 110 via the network interface and forwarded to the content enforcement module 128. The content enforcement module 128 first makes a request to the search and retrieval module 120 for content metadata relating to the content item which the user has requested. The processor of the search and retrieval module 120 retrieves the content metadata from the data storage module of the search and retrieval module 120 and returns the retrieved content metadata to the content enforcement module 128. If the content item is identified as a premium content item the content enforcement module 128 requests the current user's subscription entitlements from the subscription management module 134. The subscription management module 134 retrieves and returns the user's active subscription entitlements to the content enforcement module 128 and the content enforcement module 128 checks these against the content item subscription packages to determine if the user is entitled to view the content item. If the content item is identified as being restricted by territory the content enforcement module 128 requests the content receiver's territory from the content receiver profiler 136 and checks if the content receiver is entitled to access the content item. Finally the content item is checked to see if it is marked as restricted.

If all conditions are met and the user is eligible to view the content, the URL of the content item is transmitted by the content enforcement module 128, via the network interface 112, to the content receiver. Upon reception of the content URL the content receiver can then retrieve and play the requested content item from the content owner's content source. Optionally the content enforcement module 128 may request a content access authorisation token from the content owner which is transmitted to the content receiver and used by the content receiver when retrieving the content item. This enables the content owner to restrict access to their content to trusted MDMS content receivers.

For broadcast content, non-encrypted metadata of the TV schedules is used instead of MediaRSS (or equivalent) content item meta data from publishers. Standards exist to identify the broadcast content item, e.g. DVB or CRID artifacts in the TV Anytime meta-data specifications (http://www.tv-anytime.org) as well as to control the tuner hardware to acquire and store or decode the content item. Whether the content item is stored first (for example on the hard disk of a PVR) or decoded directly, proprietary security software may be used to de-crypt encrypted content for decode and playback purposes.

Since the success or failure of the decryption process usually cannot be known before the time, and since the compatibility of the content to the devices playback capabilities are usually assured, for devices equipped with conditional access systems, the MDMS typically takes a passive role and stores only the outcome of the decryption event, i.e. success or failure status.

In one embodiment, where no Conditional Access software exists to control the decryption of broadcast content items, and yet commercial control is required over their playback, the broadband derived entitlements system can be used to provide controlled access to non-encrypted broadcast content using the system described here-in.

In one or more embodiments of the present invention, content enforcement for broadcast content is implemented using a conventional broadcast Conditional Access (CA) system which utilises the encryption of signals and decryption by receivers utilising appropriately entitled smart cards.

If, as a result of a determination by the content enforcement module 128, the content requested by a user cannot be viewed by that user then the content enforcement module 128 transmits, via the network interface 112, to the content receiver one of a number of response conditions:

Subscription required with the subscription offers. The offers are presented and if one selected a payment process is initiated by the content receiver against the payment services module 130. On completion of this process the content URL is re-requested from the content enforcement module 128.

PIN required. The PIN is then submitted with a re-request for the content URL which is checked by the identity services module 124 before the content URL is returned.

Unauthorised content. Access to the content is denied.

When a payment process is initiated against the payment services module 130 the content receiver issues a request to the payment services module 130 which returns for payment details to the content receiver. This causes the content receiver to effect display of a payment details request message on an associated display device. In response to the message a user may have the options of rejecting the request for payment details or accepting the request. If the request is accepted, the user is prompted to enter appropriate payment details which are returned to the payment services module 130 via the communications network 104 and network interface 112. As will be appreciated, the user commands in response to the payment details request may be entered via a user interface device, such as a remote control, of the content receiver.

When payment details data is received, confirmed and successfully processed by the payment services module 130, it transfers the subscription purchased to the subscription management module 134 where it is stored against the current user in the associated subscription storage module. The subscription management 134 also forwards this information to the identity services module 124 to update the user profile data relating to that user to include the subscription package upgrade.

Image transcoder 132 is configured to re-encode images stored in standard web formats (e.g. portable network graphics (PNG), JPEG) to a format supported by any given content receiver. Thus, when image data is transmitted to a content receiver, the image transcoder 132 ensures that such images are supported for display by that content receiver. The content receiver informs the image transcoder the source image URL and what image format it requires. The image transcoder 132 retrieves the source image URL over the network interface 112 and then transcodes the image into one of the required formats before transmitting the transcoded image to the content receiver.

Figure 4:
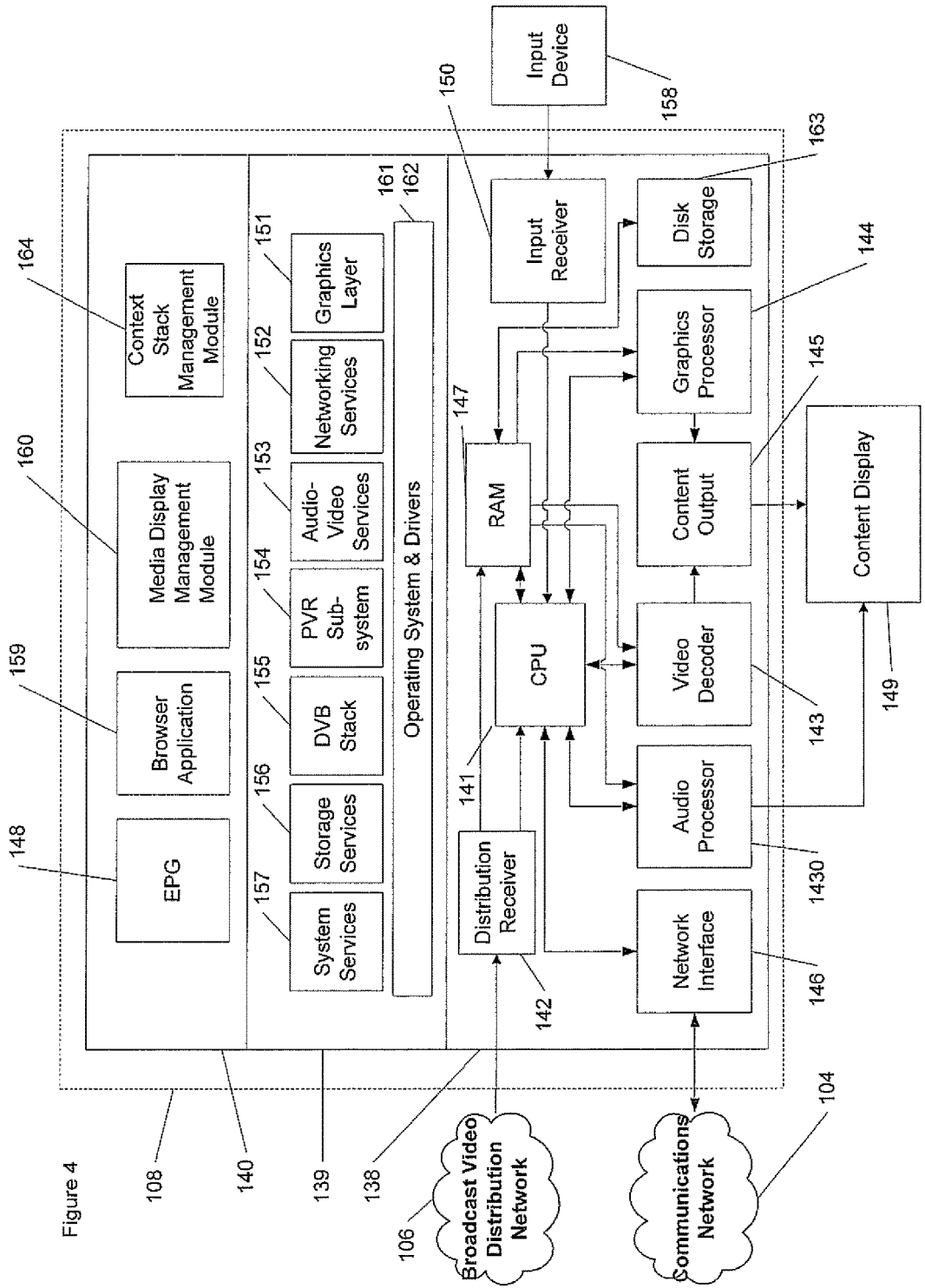

FIG. 4 schematically illustrates a content receiver 108, components thereof and components related thereto. The content receiver 108 receives content via the communications network 104 and broadcast video distribution network 106 and can transmit data to the MDMS 110 via communications network 104. Whilst data paths are illustrated between some elements of the content receiver 108, not all data paths are illustrated for the purposes of clarity.

The content receiver 108 comprises a hardware components layer 138, an OS, drivers and middleware layer 139 and a software applications layer 140. Applications in the OS, drivers and middleware layer 139 and software applications layer 140 are arranged to run on a processor (CPU) 141 of the content receiver 108.

Along with CPU 141, the hardware layer 138 comprises a distribution receiver 142, a network interface 146, a video decoder 143, an audio processor 1430, a graphics processor 144, a content output module 145, a memory component (RAM) 147, an input receiver 150, and a disk storage element 163 such as a hard disk drive.

The distribution receiver 142 (such as a tuner for receiving a terrestrial digital television broadcast) receives content at the content receiver 108 from the broadcast video distribution network 106. The data portion of such received content is communicated to the CPU 141 which, in conjunction with an electronic programme guide application (EPG) 148 running thereon, processes EPG data for use by the EPG application A video portion of the received content from the broadcast video distribution network 106 is decoded using the video decoder 143 which is instructed by the CPU 141 to retrieve video content from the distribution receiver 142 (typically using direct memory access to the RAM 147). The video content is prepared for output on the content display 149 by the content output module 145. The content output module 145 overlays any graphic output required by any of the software applications identified in the software applications layer 140 as output by the graphics processor 144 under instruction from the CPU 141 over the video content and outputs the combined output to the content display.

An audio portion of the received content from the broadcast video distribution network 106 is processed by the audio processor 1430 and output to the content display 149.

Output protocols supported by the hardware of the content receiver 108 may comprise one or more of: High Definition Multimedia Interface (HDMI); Component Video; SCART; Composite Video and audio outputs such as Dolby Digital and stereo analogue.

The OS, drivers and middleware layer 139 comprises a graphics layer module 151, a networking services module 152, an audio services module 153, a personal video recorder (PVR) sub-system module 154 for coordinating recording of content and storage of content on disk storage element 163, a digital video broadcasting (DVB) stack module (156), a storage services module 156, a system services module 157, and an operating system application 161 and drivers 162. These modules are conventional features on many content receivers (such as set-top boxes). Further description of these modules will therefore only be provided where necessary in relation to the functioning of one or more embodiments of the present invention.

Input receiver 150 is arranged to receive commands for controlling the content receiver 108, such commands being input by a user by way of an input device 158. The commands may be entered using, for example, a set-top box remote control device through which commands are entered by the user by pressing specific keys of the remote control device. A control signal from the remote control is transmitted to the content receiver 108 by any suitable means, e.g. infra-red transmission.

The software applications layer 140 of the content receiver 108 comprises: an EPG module 148 (referred to above); a browser application 159; a media display management module application (MDMM) 160; and a context stack management module 164 (hereinafter referred to as backup module 164).

Although a browser application is shown in the illustrated embodiment, other suitable interactive display engines may be used, e.g. a flash engine or SVG engine.

CPU 141 implements the EPG 148 which manages and controls content received at the content receiver 108 over the broadcast video distribution network 106. This includes the display of a broadcast content guide. It also coordinates the invocation of other applications such as the browser 159 or MDMM 160 in response to particular user actions/inputs.

The MDMM 160 runs on the CPU 141 and configures the CPU 141 for communication (via network interface 146) with the MDMS 110 in order to manage content received at the content receiver 108 over the communications network 104. Commands input by a user requesting delivery of a content item to the content receiver 108 are received at the input receiver 150 and communicated to CPU 141 which implements the MDMM 160 to request content data appropriate to the command from the MDMS 110.

Where the CPU 141 instructs the video decoder 143 and audio processor 1430 to process video received over the communications network 104 via the network interface 146 this will be marshalled by the CPU 141 in RAM 147 and then the video and audio portions will be retrieved by the video decoder 143 and audio processor 1430 using direct memory access (DMA) in the same manner as when the video was received over the broadcast video distribution network 106 via the distribution receiver 142.

In the described embodiment, the backup module 164 is arranged to identify interruptions in video content items, and to maintain a list of interruption records such as a list of video content items that a user has viewed during a viewing session and which content items have been interrupted before completion. Such a list is stored in RAM 147. The back-up module is operative to manage this list of interruption records, which may also be termed a context stack.

An interruption record contains information identifying the content item to which it relates, such as a URL or other metadata, or broadcast channel data (e.g. a broadcast frequency of that channel), or other data permitting a return to viewing the content item following interruption. Interruption records will be described in more detail later in relation to FIG. 5.

Figure 5:
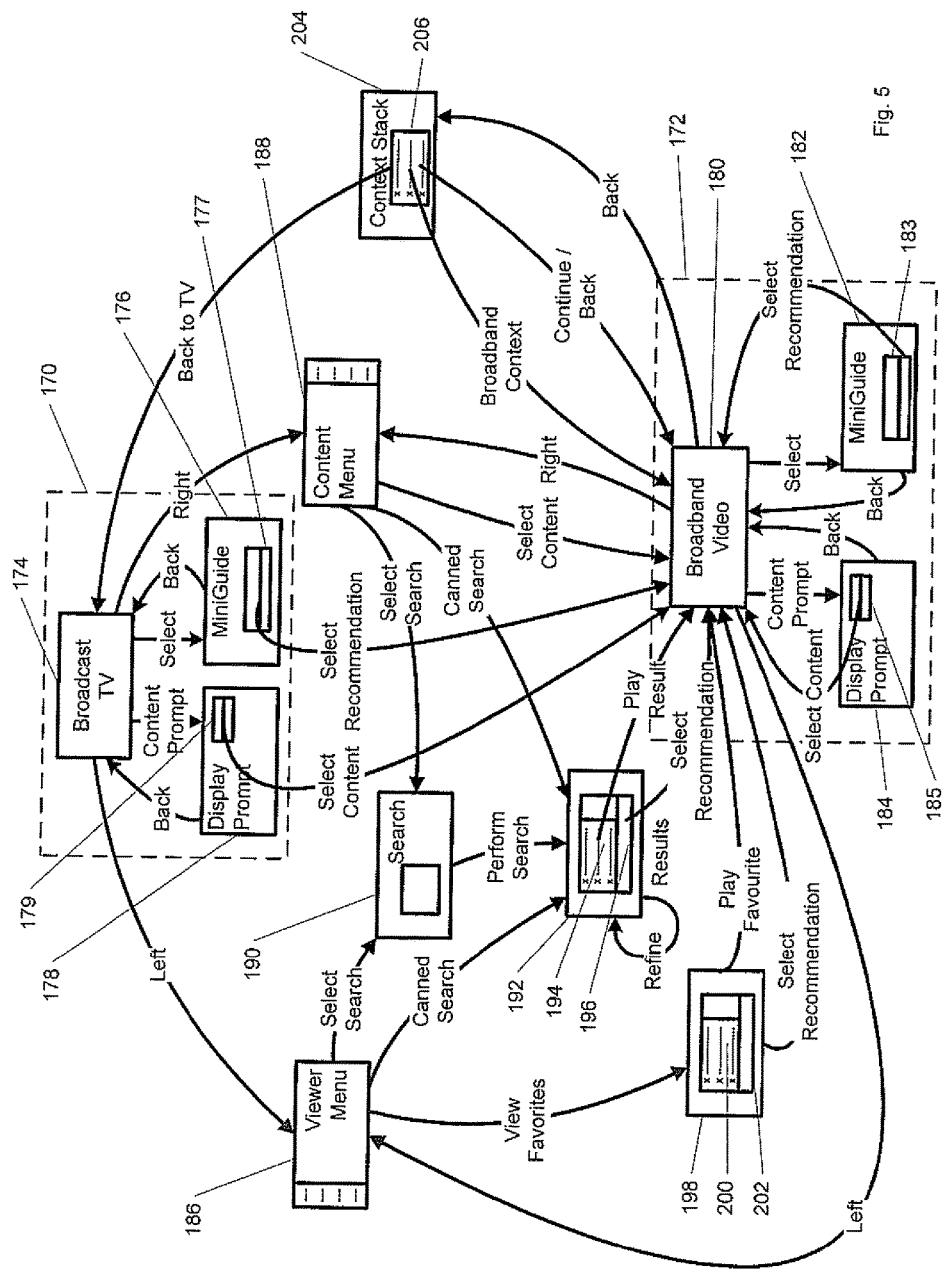
FIG. 5 is a schematic diagram illustrating video viewing domains, menus and other functions associated with the video viewing domains, available for display via the content receiver of FIG. 4 connected to the system of FIG. 1.

FIG. 5 is a schematic diagram illustrating video viewing domains, menus and other features associated with the video viewing domains, available for display via the content receiver of FIG. 4 connected to the system of FIG. 1. Each box in the figure denotes a display screen displaying one of: a broadcast video content item in a broadcast video viewing domain; a broadband video content item in a broadband video viewing domain; a menu; or some other system feature available for display during viewing of content.

The relationships between the video viewing domains, menus and other features associated with the video viewing domains are also illustrated in the figure. Arrows represent these relationships and denote operations performed by the content receiver in response to commands entered by the user via an input device. For example, such an input command may instruct the content receiver to change the display from, for example, a broadcast video content item to an overlaid viewer menu.

Template data for the display screen layout of each video viewing domain, menu and other features associated with the video viewing domain illustrated in FIG. 5 is stored in the data storage module of configuration module 114 of the MDMS 110. The template data is populated by the configuration parameters data (described above) stored in the data storage module.

A video viewing domain, menu and other features associated with the video viewing domain initiation command input by a user is received by the CPU 141 which implements the MDMM 160 to request template data for the screen from the MDMS 110. Content manager 116 receives the request and requests data from both the configuration module 114 and content receiver profiler 136 in order to populate template data fields. When said template data fields have been populated with the template data, such template data is forwarded to the network interface 112 for transfer to the content receiver 108 via the communications network. The content receiver 108 receives the template data via network interface 146. The CPU 141 instructs the graphics processor 144 to retrieve and render overlay graphics from the RAM 147 and these overlay graphics are combined with template data in the content output 145 for processing for displaying the video viewing domain, menu and other feature screen on the content display 149.

FIG. 5 illustrates the architecture of two video content viewing domains, i.e. broadcast video viewing domain 170 and broadband video viewing domain 172. The menus and other functions mentioned above are also illustrated and described in further detail below. When one of the two video content viewing domains, menus and other functions are invoked for display, video content, images, icons and/or other graphical representations are retrieved and displayed on screen by way of the content request process and template request process described above.

In the following description, the broadcast video viewing domain 170 is a default viewing domain, and the broadband video viewing domain 172, menus and other functions are invoked through particular user commands entered on the user input device 158 (for example, a remote control). However, it will be evident to a person of ordinary skill in the art that the default domain may be the broadband video domain, or any other such content delivery domain that may be implemented.

Whilst viewing displayed broadcast video 174 in the broadcast video viewing domain 170, the user can instruct the content receiver to invoke display of a broadcast content guide menu 176 (related to broadcast content currently being viewed) in the illustrated example by pressing a "Select" button on the remote control. In FIG. 5, the broadcast content guide menu 176 is termed "Miniguide". The screen displayed when the broadcast content guide menu (or TV guide) 176 is invoked is illustrated in FIG. 15. The broadcast content guide menu 176 is discussed in general detail below and in more detail in the description relating to FIG. 15.

When the content receiver accepts input from the user that indicates the broadcast content guide menu should be displayed, the input device 150 forwards a signal to CPU 141 which CPU 141 acts upon to obtain data to populate the broadcast content guide menu. Content item identifiers displayed in the broadcast content guide menu are populated from broadcast System Information (SI) received as part of a broadcast signal received at the content receiver, and describing the program schedule on each channel. In a broadband content guide menu (referred to later) the content item identifiers are populated by a current broadband playlist (i.e. selection of a broadband content item sets up the MDMM to play the item within the context of its playlist). Both sets of data are stored in the RAM 147 during operation with no communication being required with MDMS 110 to invoke display of these menus. However, broadband content recommendations associated with each content item in the broadband content guide menu do require communication between the content receiver and the MDMS to populate the recommendations associated with each content item when focus is upon a content item identifier of that content item.

Referring to FIG. 4, in the instance where an instruction is received by the content receiver 108 to invoke display of the broadcast content guide menu, CPU 141 retrieves the data for population of the menu from RAM 147, and MDMM 160 running on CPU 141 renders the specified broadcast content guide menu using the graphics processor 144. The graphics output is then forwarded to the content output 145 and the broadcast content guide menu is displayed on the content display 149. The broadcast content guide menu is displayed, for example, by overlaying, either wholly or in a transparent format, the graphics of the broadcast content guide menu over dynamic video content, i.e. the video content continues playing even though it may be partially or wholly obscured by the overlaid broadcast guide menu. In an optional arrangement the graphics of the broadcast content guide menu are displayed as a stand alone image without any content (dynamic or otherwise) behind. In another optional arrangement, the broadcast content guide menu may also be presented in a box wrapped around the video (e.g. an L-shaped box) with the video content still playing.

Whilst the broadcast content guide menu 176 is displayed, the content receiver can receive instructions from the user to cancel the broadcast content guide menu 176, so that the broadcast content guide menu, which obscures or hides the underlying displayed broadcast video 174 is removed (e.g. by pressing a "Back" button on the remote control in the illustrated example) and so that unobscured broadcast video content is displayed, or to enter the broadband video viewing domain 172. A user may view the menu to identify and select content they wish to view or set reminders or record content as is possible with conventional menus provided in, for example, a "SKY PLUS" ® system.

A prompt from a broadcaster, advertiser, etc. may be displayed on screen when the user is viewing broadcast video 174. This prompt, similar to the broadcast content guide menu 176, may be transparently or opaquely overlaid over dynamic video content. The user can invoke display of a prompt menu 178 associated with the prompt in the illustrated example by pressing a button (e.g. "Red" button) on the remote control.

Whilst the prompt menu 178 is displayed, the content receiver can receive instructions from the user to invoke display of broadcast video 174, and thus the obscuring prompt is removed and unobscured broadcast TV is displayed. Such an instruction is entered by the user pressing a "Back" button on the remote control in the illustrated example so that the broadcast video 174 is displayed. Another option available in the prompt menu 178 allows a user to instruct the content receiver to invoke display of content in the broadband video viewing domain 172. For example, the prompt may relate to an advertisement, and has associated therewith a URL of a content item comprising the advertisement. An indication by the user that they wish to view the advertisement associated with the prompt instructs the content receiver to retrieve the advertisement from the URL attached to the prompt. The content item is retrieved by the content receiver and displayed.

Whilst television broadcasters are known mainly for their broadcast content, they also provide broadband content items. Thus, a broadcaster may make content available for viewing in both a broadcast video viewing domain and a broadband video viewing domain of a content receiver. Display of a broadcaster's broadband video content may be invoked through selection of broadband video content items from a broadcast content guide menu 176.

The broadband video viewing domain 172 can be invoked when the user, whilst viewing the broadcast content guide menu 176 or the prompt menu 178, selects a broadband video content item to view from either an associated content list 177 of the broadcast content guide menu 176 (i.e. "Select recommendation" in the illustrated example) or an associated content list 179 of the prompt menu 178 (i.e. "Select content" in the illustrated example). The associated content list 177 may contain, for example, recommended content, while the associated content list 179 may contain, for example, a long-form advertisement.

Selection (i.e. "Select recommendation" in the illustrated example) of a broadband content item from the associated content list 177 of broadcast content guide menu 176 invokes the broadband video viewing domain 172 in which the selected broadband video 180 is displayed. Similarly, selection (i.e. "Select content" in the illustrated example) of a broadband content item from the associated content list 179 of prompt menu 178 invokes the broadband video viewing domain 172 in which the selected broadband video 180 is displayed.

The user can invoke a broadband content guide menu 182 (related to broadband content currently being viewed) in the illustrated example by pressing a "Select" button on the remote control when viewing broadband video 180. The screen displayed when the broadband content guide menu 182 is invoked is similar to that of the broadcast content guide menu 176 as illustrated in FIG. 15—but with content lengths displayed rather than start times.

While broadband content guide menu 182 is displayed, the content receiver can receive instructions from the user to cancel display of the broadband content guide menu 182, so that the broadband content guide menu 182, which obscures or hides the underlying displayed broadband video 180, is removed and so that unobscured broadband video 180 is displayed. Such an instruction is entered by pressing a "Back" button on the remote control in the illustrated example so that the guide menu is dismissed and an unobstructed broadband video content item is displayed. Another option available in the broadband content guide menu is selection of a new item of broadband video for display.

The display of a new item of broadband video 180 is invoked when the user, whilst viewing the broadband content guide menu 182, selects a broadband video content item to view from an associated content list 183 of the broadband content guide menu 182. The associated content list 183 may contain, for example, recommended content items.

A prompt from a broadband content provider, advertiser, etc. may appear when the user is viewing broadband video 180. The user can invoke display of a prompt menu 184 associated with said prompt in the illustrated example by pressing a button (e.g. "Red" button) on the remote control when viewing broadband video 180.

Within this prompt menu 184, the user may instruct the content receiver to cancel display of the prompt menu 182, so that the prompt menu 182, which obscures or hides the underlying displayed broadband video 180, is removed and so that unobscured broadband video 180 is displayed. Such an instruction is entered by pressing a "Back" button on the remote control in the illustrated example so that the prompt menu is dismissed and an unobstructed broadband video content item is displayed. Another option available in the prompt menu 184 is selection of a new content item from the prompt menu 184 for display.

The display of a new item of broadband video 180 is invoked when the user, whilst viewing the prompt menu 184, selects a broadband video content item to view from an associated content list 185 of the prompt menu 184. The associated content list 185 may contain, for example, an advertisement such as a short or long form advertisement.

Selection (i.e. "Select recommendation" in the illustrated example) of a content item from the associated content list 183 of broadband content guide menu 182 invokes the display of the selected content item as broadband video 180 in the broadband video viewing domain 172. Similarly, selection (i.e. "Select content" in the illustrated example) of a content item from the associated content list 185 of prompt menu 184 invokes the display of the selected content item as broadband video 180 in the broadband video viewing domain 172.

In the illustrated example of FIG. 5, display of a viewer menu 186 is invoked by a user pressing a "Left" button on a remote control when viewing broadcast video 174 in the broadcast video viewing domain 170—the particular menu configuration and options determined by the receiver and user profile. Display of a content owner menu 188 is invoked by a user pressing a "Right" button on a remote control when viewing broadcast video 174 in the broadcast video viewing domain 170—the particular content owner menu to display being determined by the broadcast channel currently being viewed. Display of the viewer menu 186 can similarly be invoked when viewing broadband video 180 in a broadband video viewing domain 172 by a user pressing a "Left" button on a remote control. Also, display of the content owner menu 188 can be invoked from a broadband video viewing domain 172 by a user pressing a "Right" button on a remote control when viewing broadband video 180 in the broadband video viewing domain 172—the particular content owner menu to display being determined by the owner of the currently playing broadband video.

When the content receiver accepts input from the user that indicates the viewer menu should be displayed, the content receiver contacts the MDMS 110 to indicate that a request for display of a viewer menu has been received. Referring to FIG. 4, the input receiver 150 forwards data to the MDMM 160 running on CPU 141 indicating that the viewer menu has been invoked. The CPU 141 sends a request for viewer menu display data to the network interface 146 for onward transmission to the MDMS 110 via communication network 104. The request is received in the network interface 112 of the MDMS 110 and forwarded to the content manager 116. The content manager 116 requests the viewer menu display data from the data storage module of the configuration module 114 which locates such viewer menu display data and returns the same to the content manager 116. The content manager 116 passes the viewer menu display data to the network interface 112 for transmission via the communications network 104 to the content receiver 108. Such viewer menu display data is received at the network interface 146 of the content receiver 108 and then passed to the CPU 141 implementing MDMM 160. The MDMM 160 renders the specified viewer menu using the graphics processor 144. The graphics output is then forwarded to the content output 145 and the viewer menu is displayed on the content display 149. The viewer menu is displayed, for example, by overlaying, either wholly or in a transparent format, the graphics of the viewer menu over dynamic video content, i.e. the video content continues playing even though it may be partially or wholly obscured by the overlaid viewer menu. In an optional arrangement the graphics of the viewer menu are displayed as a stand alone image without any content (dynamic or otherwise) behind. In another optional arrangement, the viewer menu may also be presented in a box wrapped around the video (e.g. an L-shaped box) with the video content still playing.

A number of user selectable options are displayed in the viewer menu 186, namely: search for content; a number of templated "canned" searches (i.e. a pre-configured search, for example, a themed search such as "Top 10 action thrillers"); or display a list of favourite content items.

The viewer menu display data comprises template data for the layout of the viewer menu, and further comprises template data for the "search for content", "canned search" and "list of favourite content items" features. This data is stored in the data storage module of configuration module 114 of the MDMS 110. The template data is populated by the configuration parameters data (described above) stored in the data storage module. The template data, represents the configuration options available and when combined with particular configuration parameters data specifies a particular instance of the "search for content" feature as specified by a particular party, e.g. a user.

The viewer menu display data including the display data for the user selection options available, and the required implementation of these available options is retrieved by the content receiver in the process described above and, once retrieved, is stored in the content receiver.

Figure 12:
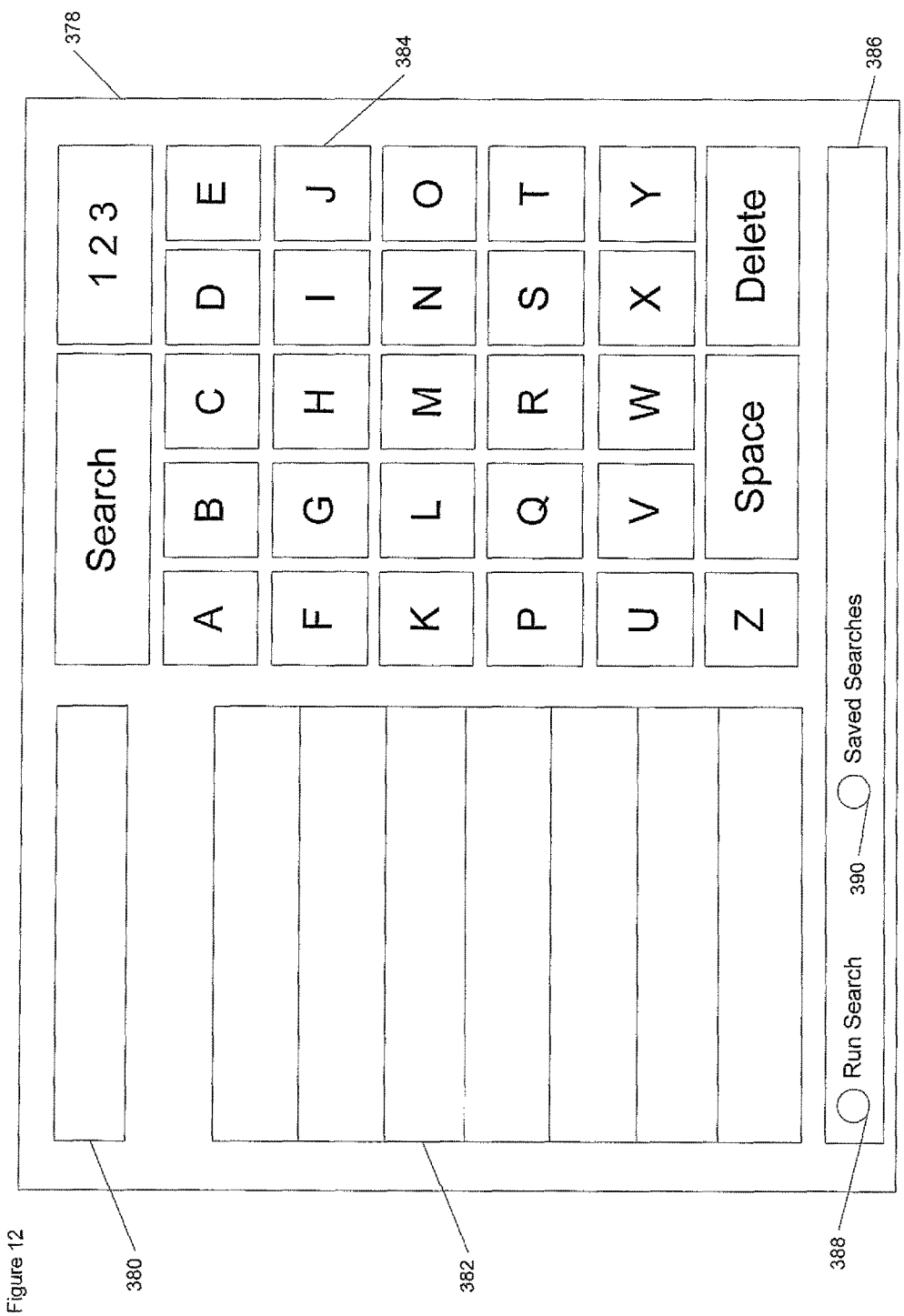
FIG. 12 shows a screenshot of a screen displayed when a content navigation feature is invoked by a content receiver in response to instructions input thereto by a user.

User selection of a "search for content" option invokes the display of a search feature 190 (also termed a "content navigation feature" later in this description). The screen displayed when the search feature 190 (content navigation feature) is invoked is illustrated in FIG. 12. The "search for content" feature is described in general detail below, and in more detail in the description relating to FIG. 12.

When, for example, a "search for content" feature initiation command is input by a user, the CPU 141 instructs the graphics processor 144 to retrieve and render overlay graphics from the RAM 147 and these overlay graphics are combined with template data in the content output 145 for processing for display of the "search for content" feature on the content display 149.

Figure 13:
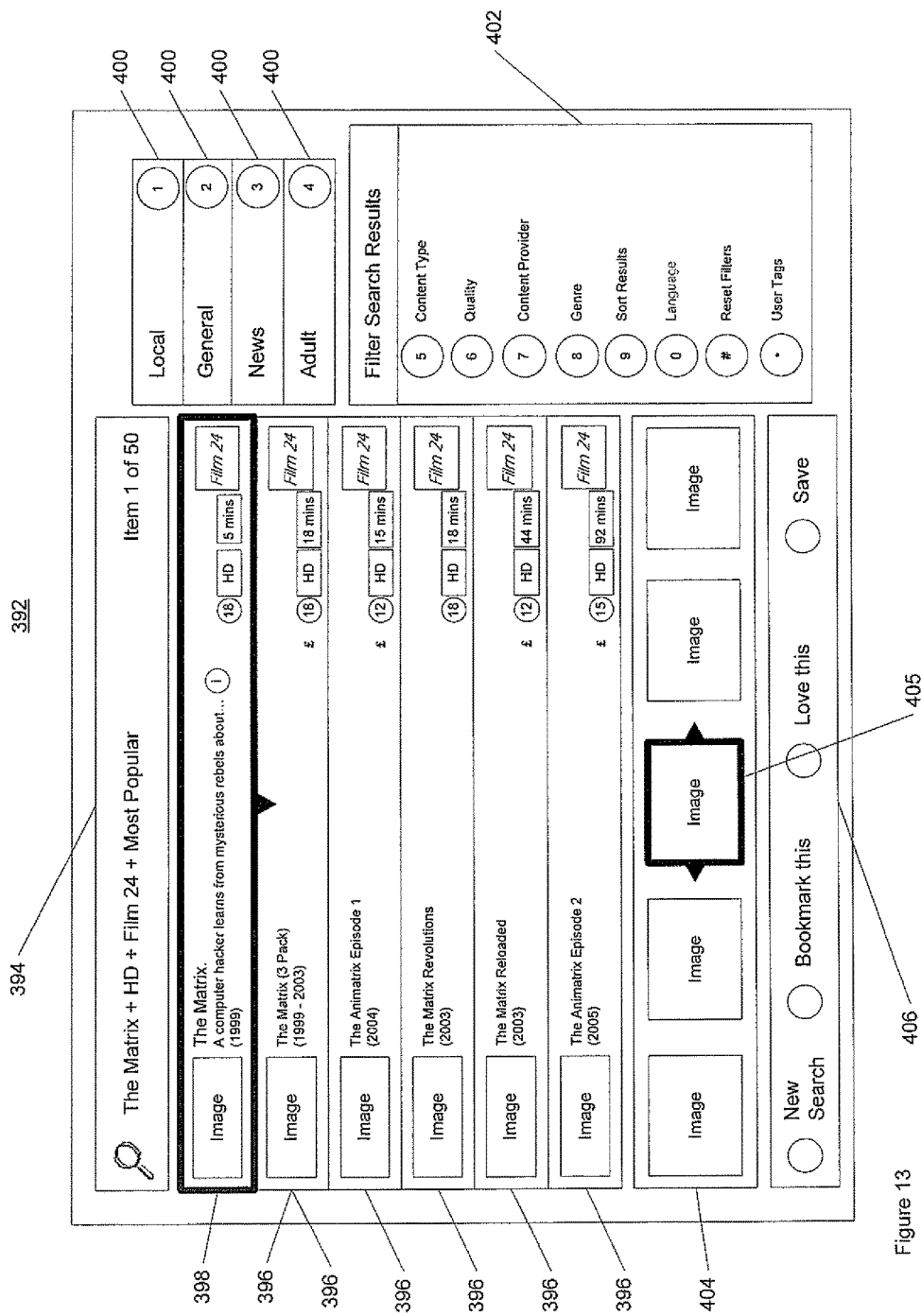
FIG. 13 shows a screenshot of a screen displayed to show results of a search invoked by a content receiver in response to instructions input thereto by the user.

A user can enter a search term in a search term entry field. Selection by the user of a "Search" function invokes a search for content based upon the search term in the search term entry field. The CPU 141, configured by the MDMM 160, sends a search request to the network interface 146 for transmission via the communications network 104 to the MDMS 110. The search request is received at the network interface 112 of the MDMS 110 and transferred to the content manager 116. Content manager 116 requests data from the search and recommendations module 122 based upon the data in the search request indicating the input search terms. The search and recommendations module 122 addresses search and retrieval module 120 to locate appropriate content data identifier items. If relevant content data identifier items are located by the search and recommendations module 122, these are transmitted to the content manager 116. The content manager 116 requests configuration parameters data for the content data identifier items from the data storage module of configuration module 114. These are located and returned to the content manager 116 which forwards both the content data identifier items found as a result of the search and the configuration parameters data to the network interface 112 for transmission to the content receiver 108. The content data identifier items found as a result of the search and the configuration parameters data are received at the content receiver by the network interface 146 and transferred to the CPU 141 which instructs the graphics processor 144 to retrieve overlay graphics data for the display of the search results from the RAM 141. The retrieved overlay graphics data is then passed to the content output 145 which processes the content data identifier items and updates the display screen data. Such display screen data, updated with the search results (i.e. the content data identifier items) is passed to the content display 149 to display a search results feature 192. The search results feature 192 comprises a content items list 194 in which the content items of the search results are displayed in a list, and an associated content list 196 in which recommended content items associated with a content item currently under focus in the content items list 194 are displayed. FIG. 13 shows an illustrative example of the search results feature 192 displayed on screen. The search results feature is described in general detail below, and in more detail in the description relating to FIG. 13.

The content items are presented in the list as content identifier items which provide at least a name of the content item (e.g. Title) and serve as links to the content they identify. When a user selects a particular content identifier item, the content item associated with that content identifier item will then be displayed to the user. An input command received by the user input is communicated to the CPU 141 which determines if the requested content is available via the broadcast video distribution network or the communication network. If available via the broadcast video distribution network, the CPU 141 sends a control signal to the distribution receiver 142 to ensure that an appropriate gateway is open (e.g. correct TV channel selected) to receive the content at the content receiver. Additionally, the CPU 141 sends a notification to the content manager 116 of the MDMS 110 via the communications network that such content is being obtained. The content manager 116 communicates with the data storage module of the configuration module 114 to locate appropriate parameters to be applied to the content and, upon location, transfers the same to the content receiver 108 via the communications network. Upon receipt of the content at the distribution receiver 142 of the content receiver 108, the content passes to the video decoder which applies the parameters received from the MDMS 110 to the content. For example, content owner branding graphics.

If the content is available via the communication network (i.e. broadband content), a content request is sent by the CPU 141 via the network interface 146 to the communication network 104 for transmission to the MDMS 110. Upon receipt of the request, the network interface 112 transfers the request to the content manager 116 which acquires location data (e.g. a URL) of the requested content from the content indexer 118 (via the configuration module 114) and returns the location data of the content source via the communications network 104 to the content receiver 108. The CPU 141 upon receipt of the location data then requests the content from a content source using the location data.

Thus, user selection (i.e. "Play result" in the illustrated example of FIG. 5) of a content item from the content items list 194 of the search results feature 192 invokes the display of the selected content item as broadband video 180 in the broadband video viewing domain 172.

Similarly, user selection (i.e. "Select recommendation" in the illustrated example of FIG. 5) of a content item from the associated content list 196 of the search results feature 192 invokes the display of the selected content item as broadband video 180 in the broadband video viewing domain 172.

As noted above, one or more canned search options may also be available within the viewer menu. Selecting a canned search option invokes the canned search in a similar manner to that described above except that no search terms are entered by the user. Rather the specific search executed is determined by the configuration of the template data returned when the menu. The canned search results are returned and displayed in feature 192 populated as described above.

Again, user selection (i.e. "Play result" or "Select Recommendation" in the illustrated example of FIG. 5) of a content item from the saved content items list 194 or associated content items list 196 of the search results feature 192 invokes the display of the selected content item as broadband video 180 in the broadband video viewing domain 172.

Another option available to the user in the viewer menu (as mentioned above) is that of invoking the display of a list of favourite content items.

Figure 14:
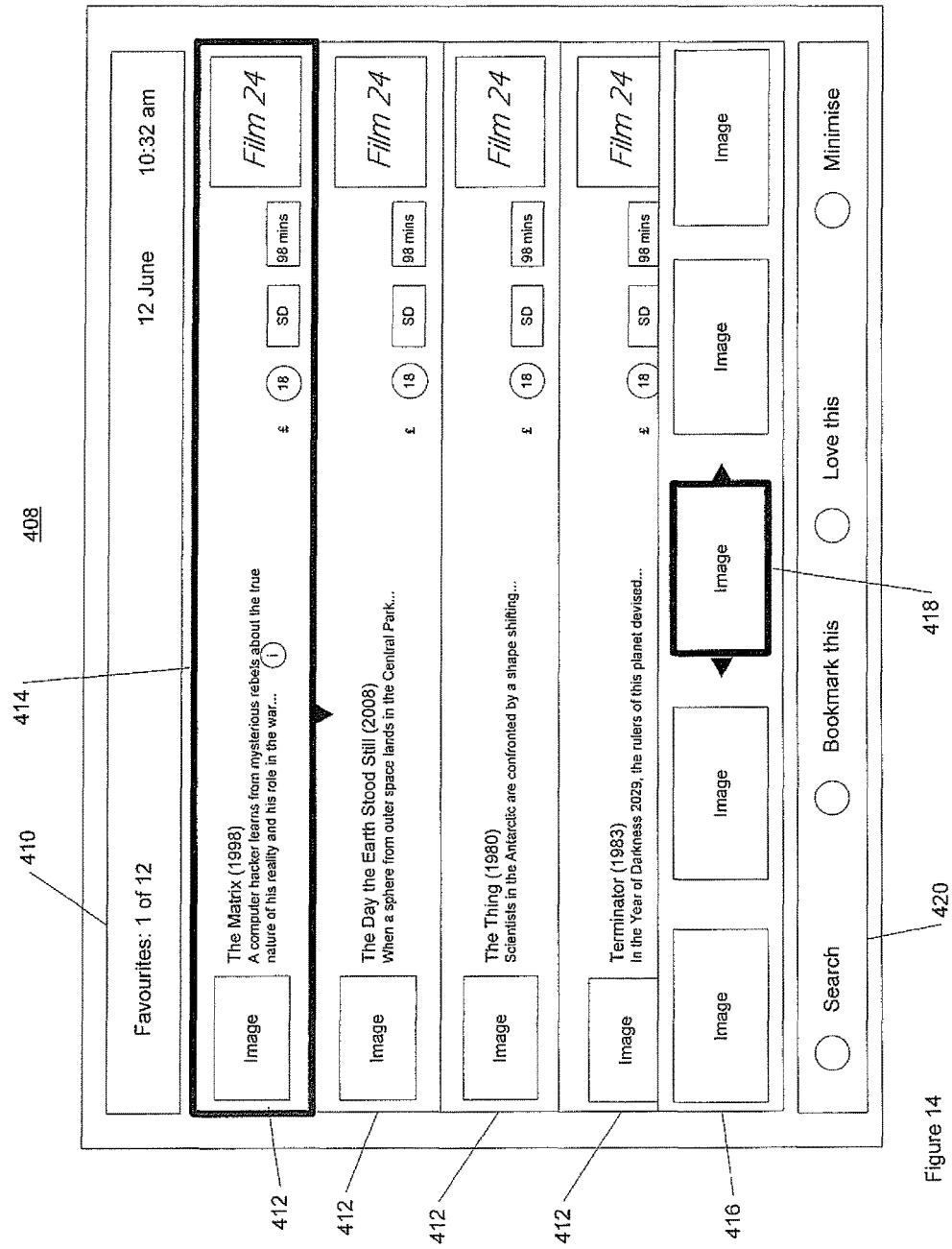
FIG. 14 shows a screenshot of a screen displayed when a playlist feature is invoked by a content receiver in response to instructions input thereto by a user.

The user selection of a display of favourite content items invokes the display of a favourites feature 198, e.g. a playlist containing a list of the user's favourite content items. The screen displayed when the favourites feature 198 is invoked is illustrated in FIG. 14 and is discussed in more detail in the description relating thereto.

The favourites feature 198 comprises a content items list 200 in which the favourite content items of the user are displayed in a list, and an associated content list 202 in which recommended content items associated with a content item currently under focus in the content items list 200 are displayed.

Display of a selected content item as broadband video 180 in the broadband video viewing domain 172 is invoked in a similar manner to that described above in relation to selecting content for display from a search/canned search menu.

A number of user selectable options are displayed in a templated content owner menu 188, namely: search for content; a number of templated "canned" searches; or a number of broadband content items to view.

The first two options are invoked in a similar manner to that described above in relation to the viewer menu.

A number of content owner broadband content items may be displayed in the content owner menu 188 and such content items can be selected for viewing by the user.

The mechanism by which a user may instruct the content receiver to invoke display of the above described viewing domains, menus or other features, is, for example, by pressing a button (e.g. a Red button) on an input device (e.g. remote control). When the content receiver receives input from the user for invoking display of video content, a menu or other feature, the content receiver contacts the MDMS 110 to indicate that such display has been invoked. Referring also to FIG. 4, the input receiver 150 forwards data to the MDMM 160 running on CPU 141 indicating that the display of a menu or other feature has been invoked. The CPU 141 sends a request for display data to the network interface 146 for onward transmission to the MDMS 110 via communication network 104. The request is received in the network interface 112 of the MDMS 110 and forwarded to the content manager 116. The content manager 116 requests the display data from the data storage module of the configuration module 114 which locates such display data and returns the same to the content manager 116. The content manager 116 passes the display data to the network interface 112 for transmission via the communications network 104 to the content receiver 108. Such display data is received at the network interface 146 of the content receiver 108 and then passed to the CPU 141 implementing MDMM 160. The MDMM 160 renders the specified display of a menu or other feature using the graphics processor 144. The graphics output is then forwarded to the content output 145 and the menu or other feature is displayed on the content display 149. The menu or other feature is displayed, for example, by overlaying the graphics of the menu or other feature over dynamic video content (e.g. either wholly or in a transparent format) or presenting the graphics of the menu or other feature as a stand alone image without any content (dynamic or otherwise) behind. The menu or other feature may also be presented in a box wrapped around the video (e.g. an L-shaped box) with the video content still playing.

The user can select a content item to view by entering a command through the input device 158. When a view content request is entered through the input device 158, the CPU 141 is notified by the input receiver 150 that a request has been received to view content, CPU 141 proceeds to forward a request for the requested content in a content request to the network interface 146 for onward transmission to the MDMS 110 via communication network 104. The request is received in the network interface 112 of the MDMS 110 and forwarded to the content enforcement module 128 which checks the entitlement of the user and content receiver to view the content and returns the content URL to the MDMM 160 application on the content receiver 108 via the communication network 104. The MDMM application then makes a request to the content source specified in the content URL via the network interface 146 and communications network 104.

The content source receives the request for a content item and retrieves such a content item for return to the content receiver 108. The content item is transmitted via the communications network 104 and received in the network interface 146 of the content receiver 108. This data is retrieved by the CPU 141 and then passed to the video decoder 143 and audio processor 1430. The video decoder 143 renders the content item for display and the content item is then passed to the content output 145 to allow the content item to be displayed on the content display along with the audio output.

A user viewing content in a broadcast TV viewing domain or broadband video viewing domain may interrupt their viewing by invoking features of the system to perform other actions (e.g. view favourites, perform a search, interact with an advertisement etc.), or their viewing may be interrupted by responding to a prompt from an advertiser, content provider, or on-line/instant message (e.g. a message containing a recommendation to view a particular content item of interest) or they may view one or more further items of content. These actions lead the user away from a current video context to other applications or other video contexts, either in the same viewing domain, or a different viewing domain. In this different viewing domain, the user may select another video content item to view, i.e. the displayed video content which the user is currently viewing is replaced with other video content. From this second video context, the user may select or be led to another video context, and yet further from the original video context. As will be appreciated, the user could perform the above illustrative example actions at each video context stage indefinitely.

It will also be appreciated from the above that a viewer can move from viewing broadcast video content to broadband video content and back again. The viewer may also be presented with suggested content items for viewing, e.g. from prompts sent by advertisers, or messages from friends via an instant messaging service implemented over the system. A viewer may also perform searches for content items, and recommended content items may be presented alongside search results.

There is a possibility that a viewer may become distracted from their intention of viewing a particular content item, or interrupt their viewing of a particular content item, to view one or more other content items. These other content items may be suggested or recommended to the viewer, or the viewer may have searched for these other content items of their own volition. Thus, it may be difficult for a user to recall a content item which they intended to view originally, or a content item which was interrupted whilst they viewed other content items.

At some point, the user may wish to return from what they are currently viewing (i.e. a current video context) to a previous (or earlier) video context to continue viewing a video content item they were viewing previously and which video content item was interrupted. They may wish to re-start such earlier video content from the beginning, or join the video content item from the point at which they performed the interrupt, or were interrupted. If the video content item to which they return is a live broadcast, then the content receiver, if capable (i.e. containing a recording function and storage disk) will have recorded the live broadcast from where the user left it, to allow the user to continue their viewing from where they left the broadcast. This recording process is described further in detail below.

As discussed above, during a viewing session the user may perform an action which interrupts their viewing of a current video content item. Such an action may be through a key-press of a button on the input device 158 that initiates the reception of a different content item, e.g. playing of a different video. In response to such a request the backup module, executed on the CPU, identifies the interruption and saves information (described further below) relating to the currently viewed content item (and an associated playlist of the content item) to the RAM 147 before the content receiver plays the different video. The information is saved to RAM 147 as an interruption record.

If a second video interrupt is subsequently actioned by the user, the backup module, executed on the CPU, identifies the interruption and saves information relating to the different video referred to above (i.e. current content item), and an associated playlist, to the RAM 147 before the content receiver plays the actioned video. Again, this information comprises an interruption record to be stored in the RAM 147, although this interruption record is different to that corresponding to the first video interrupt.

Information relating to further interrupted content items may be saved as corresponding interruption records in the RAM in a similar manner, so that a record of content items viewed and interrupted is maintained. In this regard a "stack" of interruption records, each corresponding to an interrupt in a particular video context, is maintained by the backup module in the RAM 147.

Each interruption record comprises a locator to identify from where the content item to which it relates can be retrieved. This locator may be a channel service descriptor (typically consisting of network ID, transport ID and service ID), which thus enables a tuner of the content receiver to re-tune to that channel if the content receiver receives an instruction to return to live television.

The locator may also be an address of a disk storage element 163 of the content receiver. Thus, if a broadcast video content item is interrupted, the content receiver will record the broadcast video content item to the disk storage element 163.

Recording of the broadcast content item is initiated by the content receiver when an instruction is received to display some other content item. The recording process itself is convention and is well known in the function and operation of PVR set-top boxes.

In order to allow display of the recorded broadcast video content item at a later time, the content receiver includes the start address of the broadcast video content item on the disk storage element 163 in the interruption record for that broadcast video content item. Therefore, if the interruption record corresponding to the interrupted broadcast video content item is selected from the context stack to invoke display of that item, the content receiver can retrieve the interrupted broadcast video content item from the disk storage element using the start address data in the locator of the interruption record.

The locator may also comprise a URL of an item of broadband video content. Thus, if a broadband video content item is interrupted, a record of its location is retained to allow retrieval of that interrupted item at a later time.

The interruption record may also comprise one or more of the following: title data; timing data; meta-data; or still or moving image data.

The title data comprises a title of the content item to which an interruption record relates. Such title data may only be applicable where a visual representation of the context stack is displayed.

The timing data may be recorded in the interruption record for broadband video content items. Such timing data denotes the elapsed time from the start of the content item to a point at which it was interrupted. Thus, if a broadband video content item is retrieved by the content receiver using the URL stored in the interruption record (having been selected for display), the timing data allows the content receiver to locate the point at which interruption occurred and invoke display of the content item from the point at which interruption occurred. Optionally, or additionally, where a visual representation of the context stack is displayed, the amount of run-time left or having elapsed for the content item may be displayed.

The meta-data may comprise a brief synopsis of the content item and associated content images e.g. cover art.

Still image data of the interruption record may comprise an image file, captured by the content receiver, of the frame of a content item at the point of interruption. Again, such image data may only be applicable where a visual representation of the context stack is displayed.

In order to capture the frame image at the point where the content is interrupted (i.e. when the CPU 141 receives an interrupt signal), the CPU 141 requests the current frame data from the video decoder 143 and stores such data with the other information for the interruption record of that interrupted content item in the stack in RAM 147.

Moving image data of the interruption record may comprise a moving image file corresponding to an excerpt from the video content item to which it relates. Again, such image data may only be applicable where a visual representation of the context stack is displayed.

In order to capture moving image data at the point where the content is interrupted (i.e. when the CPU 141 receives an interrupt signal), the CPU 141 copies a segment of the video buffer from the RAM 147 and stores this with the other information for the interruption record of that interrupted content item in the stack in RAM 147.

When the user wishes to return to a previous, or earlier, content item, such a return is invoked through a key-press of a button on the input device 158. The return function signal is received at the CPU 141 via input receiver 150, and the backup module 164 running on the CPU 141 retrieves the interruption record relating to the previous, or earlier content item stored on the RAM 147. This interruption record is used by the CPU 141 to retrieve the content item from the content source via the communications network 104 and play the content item from the point of interruption or from the beginning; return the viewer to a point in a recorded broadcast content item via the broadcast video distribution network 106; or return the viewer to a live point in a live broadcast content item by tuning the content receiver to a channel on which that live broadcast content item is being broadcast.

In this arrangement, the interruption records are arranged in the stack in a "last-in, first-out" manner. Thus, a single "back-up" key-press will invoke display of an immediately previous, i.e. first, content item to the content item currently being viewed. A second "back-up" key-press will invoke display of a second content item previous to the first content item. A further "back-up" key press invokes display of a third content item, previous to the second content item, and so on.

The content receiver may optionally provide a visual representation of the stack which is displayed via the content receiver when the user invokes a return (or "back-up") function, such as by pressing a "back-up" key on an input device. The backup module 164, executed on CPU 141, retrieves interruption records relating to the previous, or earlier content item stored on the RAM 147, and these interruption records are transferred to the graphics processor 144 for rendering for display.

This visual representation of the stack comprises a context stack feature 204 which may be overlaid over currently playing video content in a similar manner to other features/menus described above. The context stack feature 204 contains a list of one or more content item identifiers 206 each representing an interrupted content item. The list may include a content item identifier relating to the current content item.

The content item identifiers have associated therewith an interruption record relating to an interrupted content item. An interrupted content item can be displayed when the user selects a corresponding identifier item. Each identifier item contains information comprising a visual representation of the data in the interruption record. This information may include, for example: meta-data relating to the content, such as a brief synopsis of the content item; a time-bar icon illustrating the content length and the point which was reached when the user stopped viewing the content item; and a thumbnail image displaying the frame image captured at which the content was left, or a general image relating to the content.

When display of the context stack feature 204 is invoked, the interruption records are retrieved from the stack in RAM 147 by the CPU 141 and passed to the graphics processor for rendering for display via the content display 149 as the content identifier items of the list 206.

User selection of a content item from the list of interrupted content items 206 instructs the content receiver to: dismiss the context stack feature (i.e. "Continue/Back"), so that the context stack feature displayed over the currently playing video content, and obstructing or hiding that content, is removed and so that unobscured broadband video is displayed; dismiss the context stack feature, stop the currently playing video content, and play an interrupted content item selected by the user from the context stack (either from the point of interruption or the beginning), and thus remain in the broadband video viewing domain 172; or dismiss the context stack feature, stop the currently playing feature and tune to live or recorded broadcast TV (i.e. "Back to TV").

Figure 6:
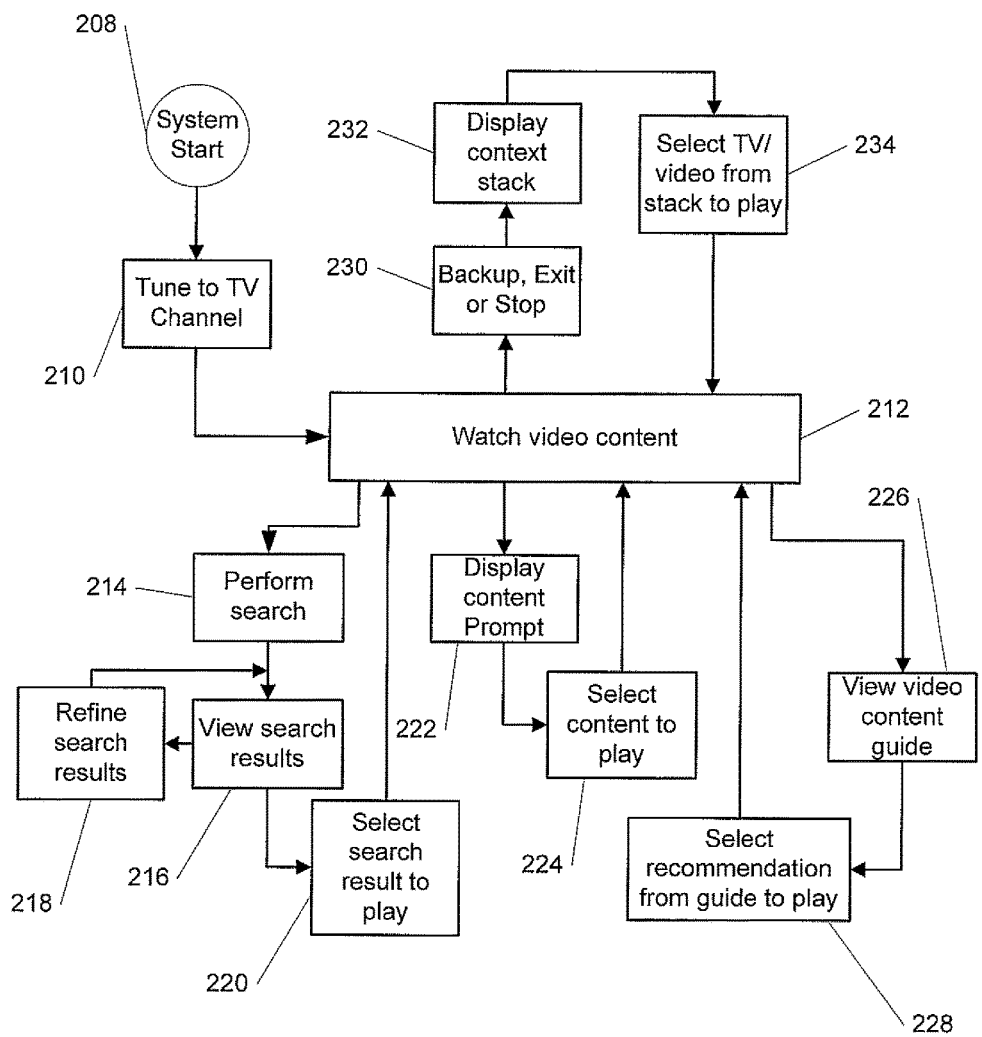
FIG. 6 is a schematic process flow control diagram illustrating steps which a content receiver implements in response to user input instructions to invoke the display of different video content items using the system of the present invention.

FIG. 6 is a schematic process flow control diagram illustrating steps which a content receiver implements in response to user input instructions to invoke the display of different video content items using the system of one or more embodiments of the present invention.

Initially, the system is started at step 208 and the user selects an item of broadcast video content to view by instructing the content receiver to tune to a TV channel (step 210). The video content 212 (i.e. the TV channel in this first instance) is displayed for viewing by the user until the user decides to perform another action on the system or their viewing is interrupted by a prompt.

An action that the user might perform whilst viewing an item of video content (broadcast TV or otherwise) is to instruct the content receiver to invoke a search feature 190 of the system to perform a search for content (step 214). When the search is complete, a list of search results is displayed (step 216). Options available for selection by the user are: refining the search results (step 218), in which case an updated set of search results is displayed; or selecting a content item from the search results for display (step 220). Upon user selection of a content item from the search results, the content receiver invokes display of the selected content item (step 212).

Another action that the user might perform while viewing an item of video content is to react to a content prompt 178, 184 displayed over the content item (step 222). When the content receiver receives a user response to such a content prompt (step 224) it invokes the display of a content item associated with the content prompt (step 212). Such a content prompt may be displayed when a particular advertisement is displayed in, for example, broadcast TV content, and may offer the user the option of viewing a long-form version of the advertisement. For example, an advertisement break in a broadcast TV content item contains a 30 second advertisement for a BMW® X1 vehicle. A prompt is displayed during the advertisement and, if the user responds to the prompt, this invokes the display of a 4 minute version of the advertisement.

Yet another action that the user might perform while viewing an item of video content is entering commands which instruct the content receiver to invoke the display of a broadcast or broadband content guide menu 176, 182 (step 226). The user can select a recommended content item from the broadcast or broadband content guide menu 176, 182 for display (step 228) and, upon user selection of a content item from the recommended content items, the content receiver invokes display of the selected content item (step 212).

As will be appreciated, although the act of viewing video content is represented as a single step (212) in the figure, there are three different video contexts in the illustrated example, namely; a broadcast TV programme; a long-form advertisement; and an item of recommended content. Of course, there may be greater or fewer video contexts in one particular viewing session and these will depend upon the actions the user has performed and the content items displayed during the viewing session. Each interrupted content item comprises a video context.

Should a user wish to view an interrupted content item, i.e. that of a different video context from the current video context, in a particular viewing session, then they can instruct the content receiver to invoke the display of a video context stack by entering a command on their remote control (step 230), e.g. pressing a "Back-up", "Exit" or "Stop" button on the remote control in the illustrated example. Once the command has been entered, the content receiver invokes display of the context stack (step 232) which contains a list of a current content item and interrupted content items. The user can select (step 234) a particular interrupted content item to return to be displayed, or continue viewing the current content item and, upon selection by the user of a particular item, the content receiver invokes display of the selected item (step 212).

Figure 7:
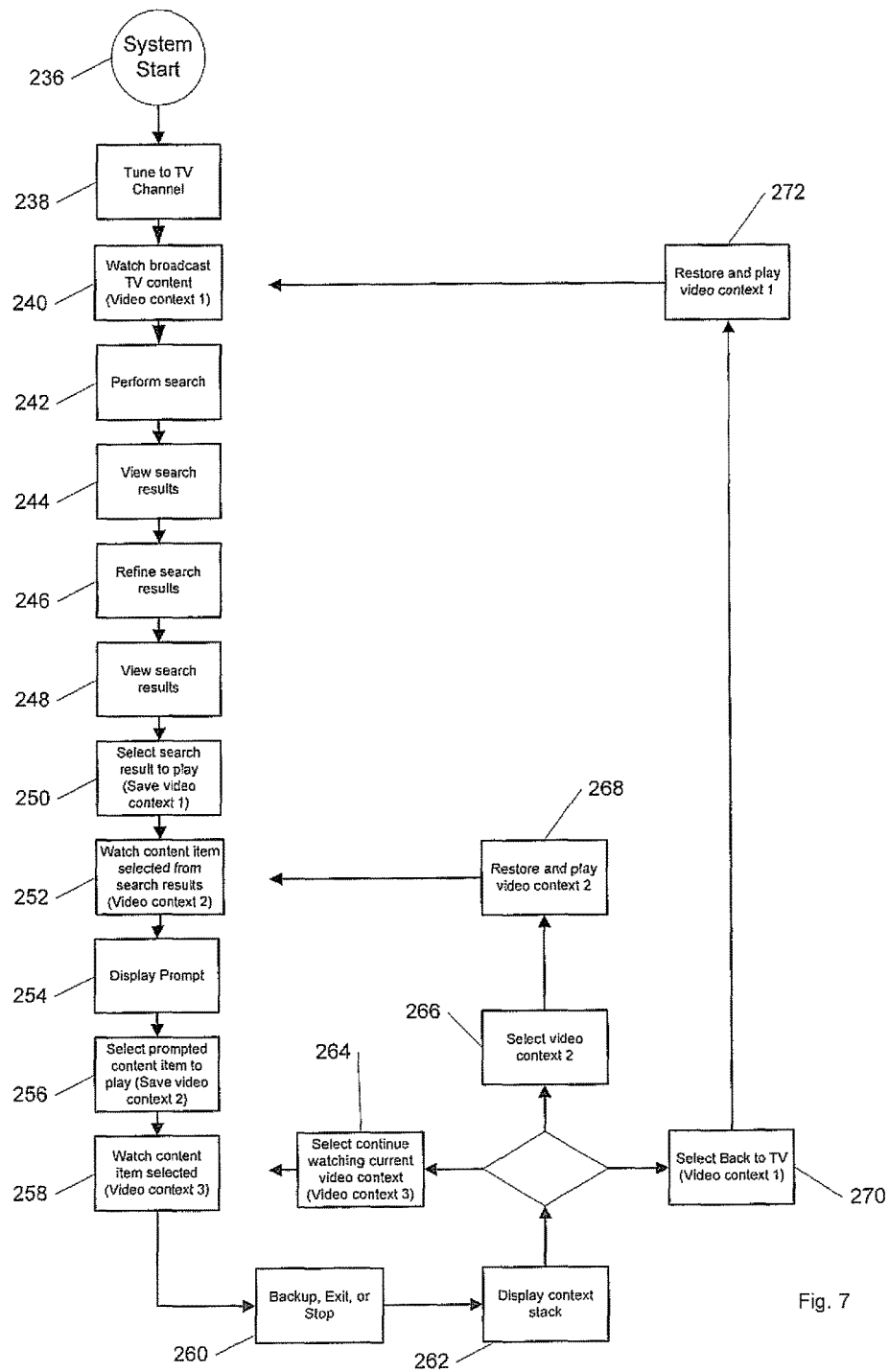
FIG. 7 is a schematic process flow control diagram illustrating steps which a content receiver implements in response to user input instructions for the display of different items of content.

FIG. 7 is a schematic process flow control diagram illustrating steps which a content receiver implements in response to user input instructions for the display of different items of content. It illustrates a "walkthrough" from content receiver start-up through different user actions and subsequent display of a video content item by the content receiver in response to each of those actions. In FIG. 6, the steps of each action were all redirected back to "View video content" to indicate that a user could instruct the content receiver to perform each action any number of times. In the present example of FIG. 7, the steps are arranged in a linear manner because the figure illustrates a particular viewing session of a user.

The content receiver is started (step 236) and the user selects an item of broadcast video content to view by instructing the content receiver to tune to a TV channel (step 238). This is a first video context (i.e. video context 1) in this particular walkthrough. The displayed video content is displayed (step 240), i.e. the TV channel in this first instance, until the user decides to perform a search for content by instructing the content receiver to invoke display of the search feature 190 (step 242).

When the search is complete, the content receiver invokes display of a list of search results (step 244). In this particular example, the user chooses to refine the search results and instructs the content receiver accordingly (step 246). In response, the content receiver invokes display of an updated set of search results (step 248). Upon selection of a content item from the search results by the user, the content receiver invokes display of the selected content item (step 250) and a first interruption record corresponding to the previous video content item (video context 1) is created as described above and is saved to the context stack. In this particular example, the video content item in video context 1 continues to be displayed whilst the user is performing a search (e.g. the search feature may be displayed transparently over the video content item, or arranged in a box overlaying the video content) and is only stopped and saved once the user selects a new content item to for display via the content receiver.

The content item selected from the search results (video context 2) is displayed (step 252) and, whilst such content item selected from the search results is displayed, a content prompt may be displayed over the content (step 254). When the user responds to such a content prompt by selecting a content item to view (step 256), the content receiver creates a second interruption record corresponding to the currently viewed video content item (video context 2), and saves such second interruption record to the context stack. The content receiver invokes display of the new content item selected from the prompt, i.e. video context 3, (step 258).

Whilst viewing the displayed video content item in video context 3, the user then decides to return to an interrupted content item. By pressing a "Back-up", "Exit" or "Stop" button on the remote control (step 260), this instructs the content receiver to invoke the display of the context stack feature 204 (step 262) which comprises (as described above) a menu containing a list of content identifier items 206. A content identifier item of the list corresponds to the currently viewed video content item and one or more other content identifier items correspond to interrupted video content items. The user may select from this context stack feature 204 from options of: continuing viewing of the current video in video context 3 (step 264); display of the video content item in video context 2 (step 266); or display of the video content item in video context 1 (step 268).

If a selection is made which instructs the content receiver to invoke display of the interrupted video content item in video context 2, the content receiver retrieves the interruption record corresponding to that video content item and, using the data of the interruption record, locates and retrieves that content item as described above for subsequent display. (step 270).

If a selection is made which instructs to the content receiver to invoke display of the interrupted video content item in video context 1, the content receiver retrieves that content item as described above and the content item is subsequently displayed (step 272).

Figure 8:
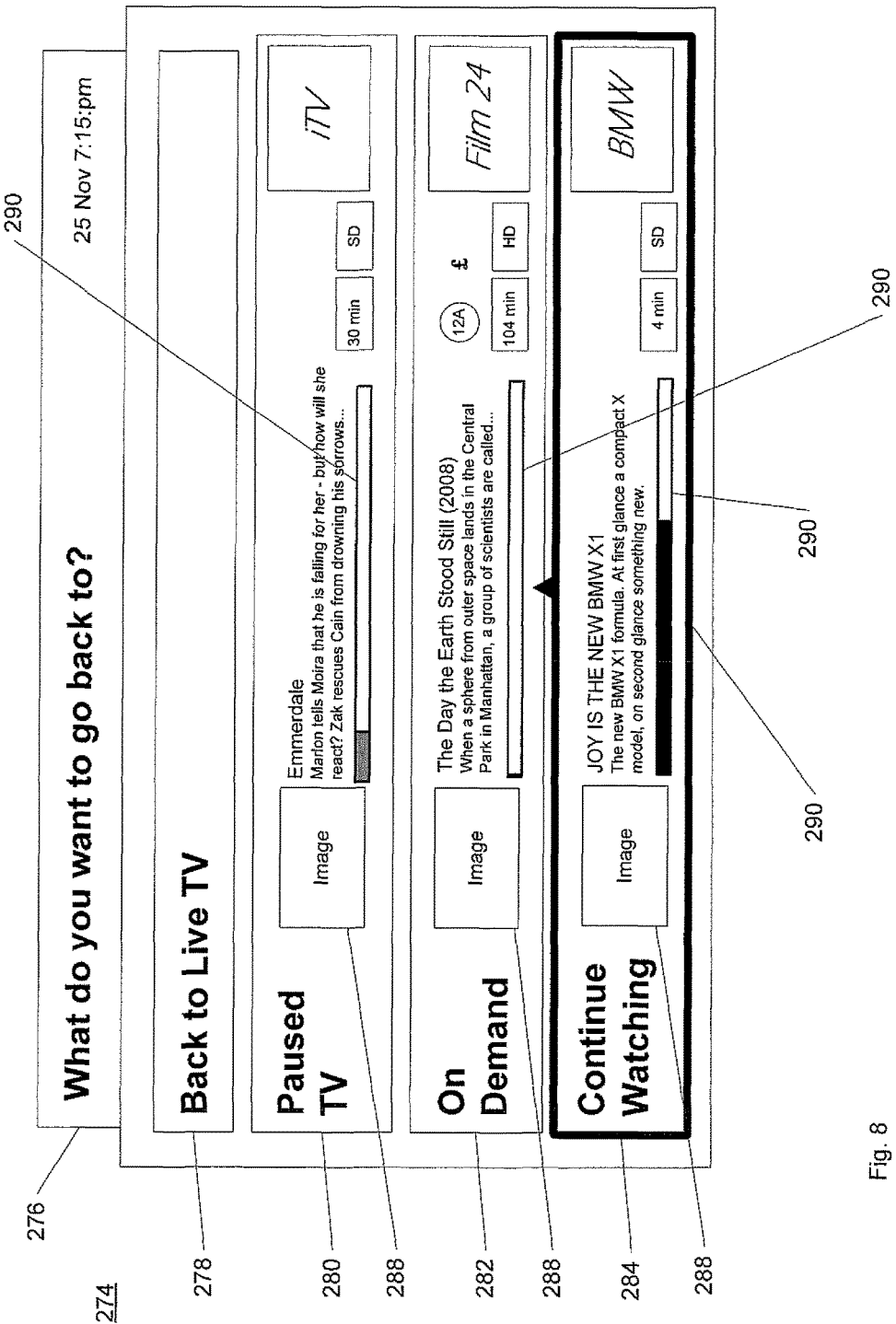
FIG. 8 shows a screenshot of a context stack screen displayed when a step of FIG. 7 is initiated.

FIG. 8 shows a screenshot 274 of a context stack screen displayed when step 262 of FIG. 7 described above is initiated.

The context stack screen contains a heading field 276 which contains a question to the user such as "What do you want to go back to?", as a prompt to the user to select an option of video content items for display. Available items are displayed in a list of selectable option fields 278, 280, 282, 284.

The options available in the illustrated example are: "Back to Live TV" 278, i.e. video context 1; return to "Paused TV" 280, i.e. video context 1; return to "On Demand" 282, i.e. video context 2; or "Continue Viewing" 284, i.e. continue viewing the content item being viewed (video context 3) when the display of the context stack was invoked.

Cursor 286 comprises a movable indication feature which highlights one option in the list of selectable options. The cursor is movable vertically from a first position where a first option identifier item is highlighted to a second adjacent position where a second option identifier item is highlighted responsive to user input via the remote control (e.g. Up/Down keys of the remote control).

When the cursor 286 is located over an option, the highlighted item may be enlarged (compared with other options in the list) and/or gain a border.

One or more of the option fields 278, 280, 282, 284 may contain information relating to the video content to which they relate, e.g. Quality (HD/SD), Premium Icon (to indicate that payment is required to view the content), age certificate icon, a content owner logo, content length, whether the content is broadcast video or Internet video content, and one line synopsis of content. These fields may also contain image data 288 and/or video data identifying the video content item to which they relate. The image data may comprise images and/or icons in a particular format e.g. JPEG and may be, for example, a frame captured from the video content item at the point at which that content item stopped being displayed in order for the display of another video content item.

One or more of the option fields 278, 280, 282, 284 may contain a progress bar 290 to indicate the viewing progress of the content item to which they relate.

The cursor 286 may also comprise a directional indicator to indicate to a user that the list can be navigated using commands entered by pressing the Up/Down arrows of the remote control. If the cursor is positioned over the first item in the list only a down indicator should be visible and, likewise, if the cursor is positioned over the last item in the list (as illustrated in FIG. 8), only an up indicator should be visible.

Figure 9:
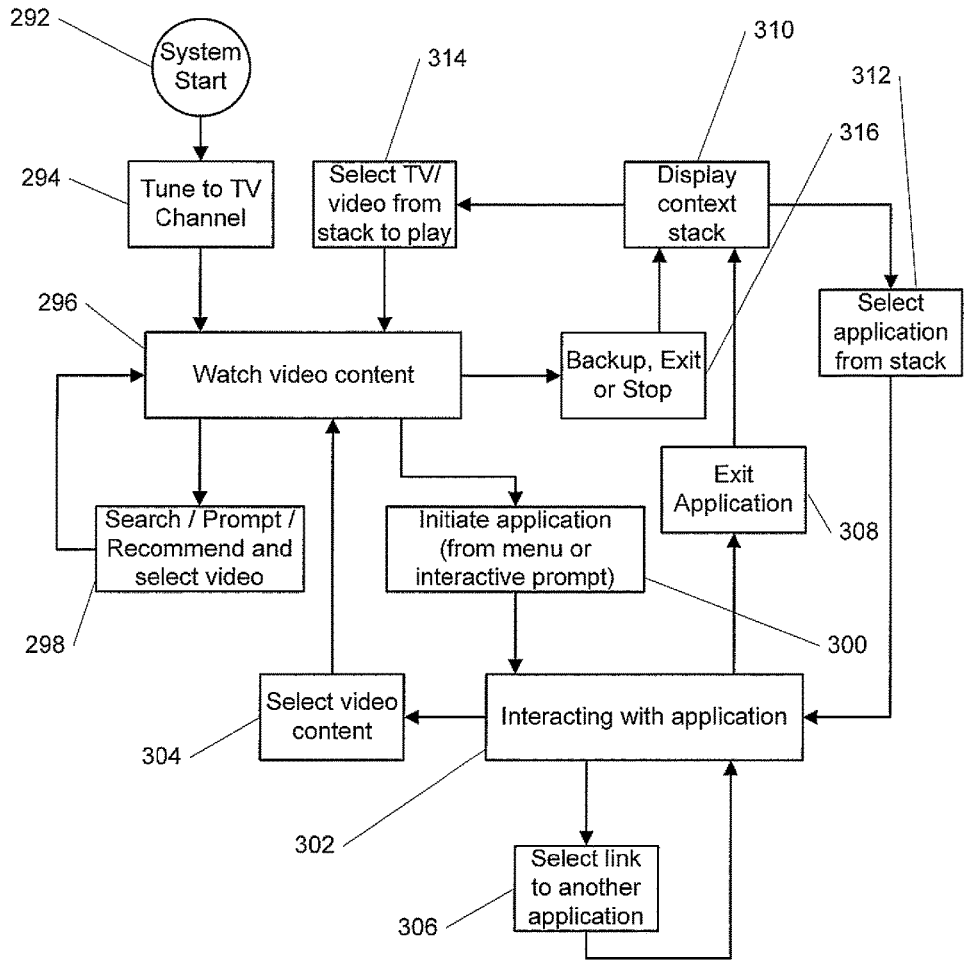
FIG. 9 is a schematic process flow control diagram illustrating steps which a content receiver implements in response to user input instructions to invoke the display of different video content items and applications using the system of the present invention.

FIG. 9 is a schematic process flow control diagram illustrating steps which a content receiver implements in response to user input instructions to invoke the display of different video content items and applications using the system of one or more embodiments of the present invention. Many of the actions illustrated in this figure are similar to those illustrated in FIG. 6. Indeed, step 292 of FIG. 9 corresponds to step 208 of FIG. 6, step 294 of FIG. 9 corresponds to step 210 of FIG. 6, and step 296 of FIG. 9 corresponds to step 212 of FIG. 6. Steps 214 to 224 of FIG. 6 have been condensed as step 298 in FIG. 9. Also, step 316 of FIG. 9 corresponds to step 230 of FIG. 6, step 310 of FIG. 9 corresponds to step 232 of FIG. 6, and step 314 of FIG. 9 corresponds to step 234 of FIG. 6. These steps will not be described in further detail since they are the same as those already described in relation to FIG. 6.

FIG. 9 differs from FIG. 6 in that it includes steps which the content receiver, in response to instructions input by a user, may take to invoke the display of different applications using a system in accordance with an embodiment of the present invention. These steps will be described in more detail below.

An action that the user might perform while viewing an item of video content is to instruct the content receiver to invoke display of an interactive application (step 300), e.g. from a menu or an interactive prompt. When the application is displayed, the user is able to interact (step 302) with the application in a known manner using a remote control.

While the application is displayed the user can: select an item of video content for display (step 304); select a link which invokes display of another interactive application (step 306); or exit the interactive application (step 308). Selecting an item of video content for display invokes the display of the selected video content item by the content receiver (step 296). The selection of a link to another interactive application invokes the display of that other interactive application with which the user can interact (step 302).

An "Exit" command entered by the user to instruct the content receiver to exit from the interactive application invokes the display of the context stack (step 310) which contains a list of both interrupted video content items and interrupted interactive applications in a particular viewing session. The user can select (step 312) a particular interrupted interactive application for display, or continue with the current interactive application and, upon selection of a particular interactive application, the system displays the selected interactive application (step 302).

Invoking the display of the context stack feature 204 from an interactive application is the same as invoking display of the context stack feature 204 from a video content item as described in relation to FIG. 6. Indeed, the context stack can contain both interruption records corresponding to both video content items and interactive application.

Figure 10:
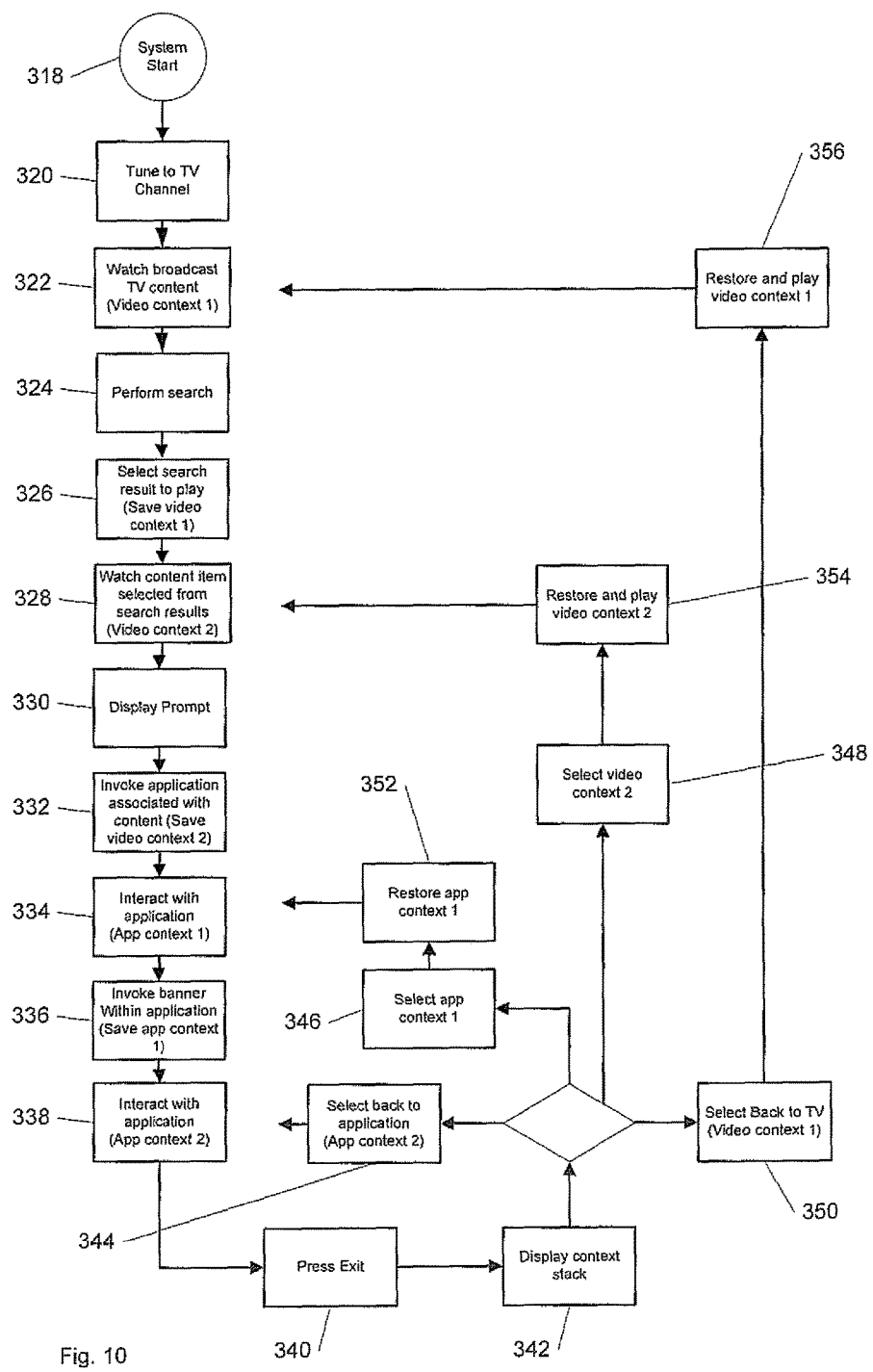
FIG. 10 is a schematic process flow control diagram illustrating steps which a content receiver implements in response to user input instructions for the display of different items of content.

FIG. 10 is a schematic process flow control diagram illustrating steps which a content receiver implements in response to user input instructions for the display of different items of content. It effectively comprises a "walkthrough" from content receiver start-up through different user actions and subsequent display of a video content item in response to each of those actions. In FIG. 9, the steps of each action were redirected back to "View video content" or "Interacting with application" to indicate that a user could perform each action any number of times. In the present example of FIG. 10, the steps are arranged in a linear manner because the figure illustrates a particular viewing session of a user.

Many of the actions illustrated in this figure are similar to those illustrated in FIG. 7. Indeed, step 318 of FIG. 10 corresponds to step 236 of FIG. 7, step 320 of FIG. 10 corresponds to step 238 of FIG. 7, and step 322 of FIG. 10 corresponds to step 240 of FIG. 7. Steps 242 to 248 of FIG. 7 have been condensed as step 324 in FIG. 10. Also, step 326 of FIG. 10 corresponds to step 250 of FIG. 7, step 328 of FIG. 10 corresponds to step 252 of FIG. 7, and step 330 of FIG. 10 corresponds to step 254 of FIG. 7. Further, step 342 of FIG. 10 corresponds to step 262 of FIG. 7, step 348 of FIG. 10 corresponds to step 266 of FIG. 7, step 350 of FIG. 10 corresponds to step 270 of FIG. 7, step 354 of FIG. 10 corresponds to step 268 of FIG. 7, and step 356 of FIG. 10 corresponds to step 272 of FIG. 7. These steps will not be described in further detail since they are the same as those already described in relation to FIG. 7.

FIG. 10 differs from FIG. 7 in that it includes steps which the content receiver, in response to instructions input by a user, may take to invoke the display of different interactive applications using the system of one or more embodiments of the present invention. These steps will be described in more detail below.

A content prompt may be displayed over an item of video content currently being viewed. A user response to such a content prompt instructs the content receiver to invoke the display of an interactive application, and the content receiver creates an interruption record corresponding to the currently viewed video content item (video context 2) and saves such interruption record to the context stack. The content receiver invokes display of the interactive application selected from the prompt, i.e. interactive application context 1 (step 332).

Whilst interacting with the interactive application (step 334), the user then selects a banner advertisement within the interactive application for display. Upon selection of a banner advertisement by the user, the content receiver invokes display of an interactive application (interactive application context 2) associated with the banner advertisement, and an interruption record corresponding to the previous interactive application (interactive application context 1) is created by the content receiver, and such interruption record is saved to the context stack (step 336).

The user interacts with interactive application (step 338) and then decides to leave such application and return to an interrupted video content item or an interrupted interactive application. By pressing an "Exit" button on the remote control (step 340), this instructs the content receiver to invoke display of a context stack (step 342) which comprises a menu containing a list of the currently viewed interactive application and the interrupted interactive applications and interrupted video content items. In this menu, the user has the option of: continuing viewing of the current interactive application in interactive application context 2 (step 344); display of an interrupted interactive application in interactive application context 1 (step 346); display of the video content item in video context 2 (step 348); or display of the video content item in video context 1 (step 350).

If a selection is made which instructs the content receiver to invoke display of the interrupted interactive application in interactive application context 1, the content receiver retrieves that interactive application content item as described above and the interactive application is displayed (step 352).

If a selection is made which instructs the content receiver to invoke display of the interrupted video content item in video context 2, the content receiver retrieves that content item as described above and the content item is displayed (step 354).

If a selection is made which instructs the content receiver to invoke display of the interrupted video content item in video context 1, the system retrieves that content item as described above and the content item is displayed (step 356).

Figure 11:
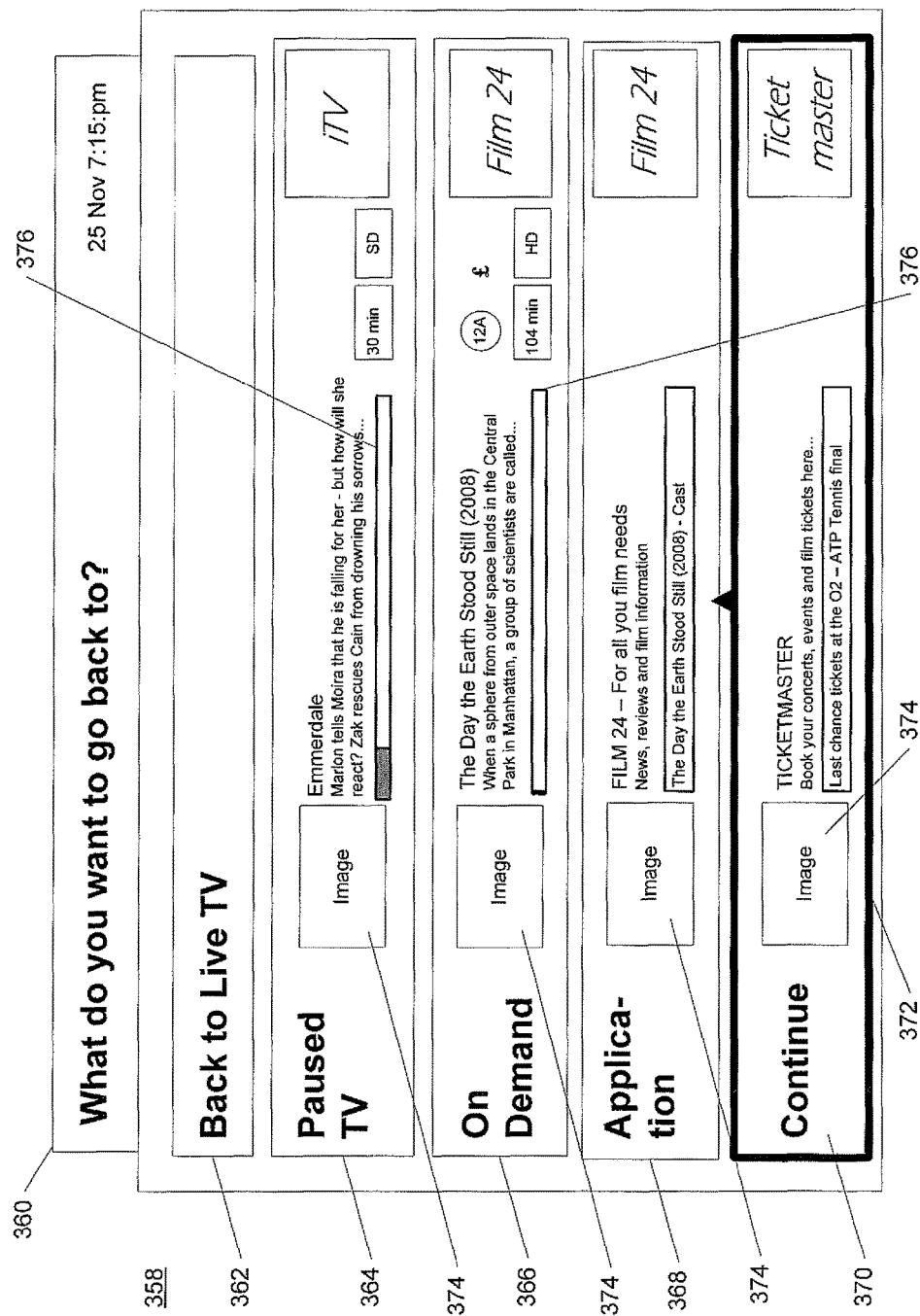
FIG. 11 shows a screenshot of a context stack screen displayed when a step of FIG. 10 is initiated.

FIG. 11 shows a screenshot 358 of a context stack screen displayed when step 342 of FIG. 10 described above is initiated.

The context stack screen contains a heading field 360 which contains a question to the user such as "What do you want to go back to?", as a prompt to the user to select an option of video content items or interactive applications for display. Available items are displayed in a list of selectable option fields 362, 364, 366, 368, 370.

The options available in the illustrated example are: "Back to Live TV" 362, i.e. video context 1; return to "Paused TV" 364, i.e. video context 1; return to "On Demand" 366, i.e. video context 2; return to "Application" 368, i.e. interactive application context 1; or "Continue" 370, i.e. continue viewing current interactive application (interactive application 2) when the display of the context stack was invoked.

As will be appreciated, this arrangement is similar to that illustrated in FIG. 8.

FIG. 12 shows a screenshot 378 of a screen displayed by a content navigation feature (referred to as a search feature 190 above) when invoked by the content receiver upon instructions input by a user. In a particular example, the user may enter commands to initiate navigation to such a feature. For instance, a viewer menu may be invoked, for example, by a user pressing a "Left" button on a remote control when viewing broadcast TV content, and display of a viewer content navigation feature is invoked by way of a further keypress (e.g. selecting an item in the menu). Display of a branded content owner menu may be invoked, for example, by a user pressing a "Right" button on a remote control when viewing broadcast TV content. Display of a branded content owner content navigation feature is invoked by way of a further keypress (e.g. selecting an item in the menu). Alternatively, display of the content navigation feature could be invoked directly e.g. pressing a "Red" button on a remote control.

Although this example relates to a content navigation feature, other features or menus (e.g. content owner, content receiver, and viewer menus, mini content guide (related to content currently being viewed) and expanded content guide (again related to content currently being viewed)) are envisaged and display of these may be invoked using similar user input commands on a remote control. How these different capabilities are designed and invoked and when they are made available to the user forms a key part of the orchestration of competing parties' aspirations in the user interface. For example a content owner menu may be available by pressing the "Right" button on the remote control when viewing a content item. The particular content menu displayed is determined by the rules of the MDMM 160 to be the content menu for the currently active content item.

Template data for the content navigation feature screen illustrated in FIG. 12 is stored in the data storage module of configuration module 114 of the MDMS 110. The template data is populated by the configuration parameters data (described above) stored in the data storage module and so the format of the content navigation feature screen will vary for different Operators, content providers and OEM contexts because these will all have specified different configuration parameters data. The template data, however represents the configuration options available and when combined with particular configuration parameters data specifies a particular instance of the content navigation feature as specified by a particular party.

A content navigation feature initiation command input by a user is received by the CPU 141 which implements the MDMM 160 to request template data for the content navigation feature screen from the MDMS 110. This template data is retrieved from the data storage module of configuration module 114 of the MDMS 110 and sent to the communications network via the network interface 112. The content receiver 108 receives the template data via network interface 146. The CPU 141 instructs the graphics processor 144 to retrieve and render overlay graphics from the RAM 147 and these overlay graphics are combined with template data in the content output 145 for processing for display of the content navigation feature on the content display 149.

The screen of the content navigation feature contains a search term entry field 380, a list of popular search terms 382, a virtual keyboard 384 and an instructions field 386.

A user may populate the search term entry field 380 using commands input via a user input device (such as a TV or set-top box remote control). By performing presses or multiple presses of numeric keys on the remote control (in a manner similar to character entry when creating text of an SMS) a user can enter alphanumeric characters in the search term entry field 380. A delete function may be assigned to a specific key (e.g. a left arrow key) to allow a user to delete characters if errors are made.

The virtual keyboard 384 can also be used to select alphanumeric characters in order to populate the search term entry field 380. A cursor comprising a movable indication or pointer feature can be used to denote which of the search term entry field 380, list of popular search terms 382, or virtual keyboard is currently, or is to be in use. In order to switch between display of the search term entry field 380 and the virtual keyboard 384, the user may invoke such a switch by pressing an appropriate key on the remote control having a switch function assigned thereto (e.g. a right arrow key) to move the cursor from the search term entry field to the virtual keyboard 384. A particular alphanumeric character (e.g. the letter "A") of the virtual keyboard 384 may be the default character indicated by the cursor when the virtual keyboard 384 is invoked. Navigation of the cursor around the keyboard is achieved by way of remote control keys having appropriate movement functions assigned thereto (e.g. Up, Down, Left, Right arrow keys). A conventional TV or set-top box remote control may be suitable. When a desired character has been reached, it is added to the search term entry field 380 by pressing a remote control key having an appropriate select function assigned thereto (e.g. Select key).

During the population process, the user commands are received by CPU 141 of the content receiver. The CPU 141 instructs the graphics processor 144 to retrieve overlay graphics data from the RAM 147 and these are passed to the content output 145 for updating the display.

In the illustrated embodiment, letter characters are the only type of alphanumeric characters shown on the virtual keyboard 384. However, the virtual keyboard may have a "123" icon which can be selected to transform the alphabetical keyboard to a numeric keyboard. When in the numeric keyboard state, the "123" icon will be replaced by an "ABC" icon to allow return to the alphabetic keyboard. In the same manner, different language (e.g. character sets such as Arabic or Hebrew) virtual keyboards can be supported as required by the operator, user, OEM or content owner configurations.

Aside from alphabetic and numeric characters and icons for switching between virtual keyboards appropriate to each, there are also displayed "Space", "Delete" and "Search" icons, with selection of the "Space" function implementing corresponding insertion of a space between characters in the search term entry field 380, and selection of the "Delete" function implementing deletion of a character in the search term entry field 380. Selection of the "Search" function executes a search for content based upon a search term entered in the search term entry field 380. The CPU 141, configured by the MDMM 160, sends a search request to the network interface 146 for transmission via the communications network 104 to the MDMS 110. The search request is received at the network interface 112 of the MDMS 110 and transferred to the content manager 116. Content manager 116 requests data from the search and recommendations module 122 based upon the data in the search request indicating the input search terms. The search and recommendations module 122 addresses search and retrieval module 120 to locate appropriate content data identifier items. If relevant content data identifier items are located by the search and recommendations module 122, these are transmitted to the content manager 116. The content manager 116 requests configuration parameters data for the content data identifier items from the data storage module of configuration module 114. These are located and returned to the content manager 116 which forwards both the content data identifier items found as a result of the search and the configuration parameters data to the network interface 112 for transmission to the content receiver 108. The content data identifier items found as a result of the search and the configuration parameters data are received at the content receiver by the network interface 146 and transferred to the CPU 141 which instructs the graphics processor 144 to retrieve overlay graphics data from the RAM 141. The retrieved overlay graphics data is then passed to the content output 145 which processes the content data identifier items and updates the display screen data. Such display screen data, updated with the search results (i.e. the content data identifier items) is passed to the content display 149 to display the content navigation feature populated with the search results.

The list of popular search terms 382 comprises a list of a plurality (e.g. twenty) of the most popular search terms, where the list is determined by characters entered in the search term entry field 380. As characters are populated in the search term entry field 380, the list of popular search terms 382 is updated. For example, if a user populates "A" in the search term entry field 380 then the list will contain a plurality of the most popular search terms beginning with the letter A. Such population proceeds via the same process as described above in relation to the display of search results.

The user can navigate the list using remote control keys having appropriate movement functions assigned thereto (e.g. Down and Up arrow keys) and can select a search term from the list to populate the search term entry field 380 by using, for example, a Select key of the remote control.

The list of popular search terms 382 may be arranged with most popular terms at the top thereof and with lower terms being of decreasing popularity.

Where no search term is populated in the search term entry field 380, then as a default, the list of popular search terms 382 may comprise, for example, the twenty "Most Popular" search terms. These may be relevant to the user's profile, for example, based on age, language, or location.

The instructions field 386 includes instructions to a user for implementing functions of the content navigation feature. In the illustrated example screenshot 378 it is indicated 388, 390 that a particular key of the remote control having an appropriate function assigned thereto (e.g. Red key) can initiate the search, and a different key of key of the remote control having an appropriate function assigned thereto (e.g. Green key) should be pressed to allow the user to access their saved searches.

FIG. 13 shows a screenshot 392 of an example search results screen displayed by the content navigation feature to show results of a search invoked by the content receiver in response to instructions input by the user. The exact layout, functionality and branding of this screen would be determined by the OEM, operator and content owner configurations as well as user preference configurations.

The search results screen of the content navigation feature contains a search term field 394, a list of content identifier items 396, a cursor 398, categories under which the search results were found 400, filtering options 402, an associated content list 404, an associated content list cursor 405 and an options field 406.

The search terms entered by the user of the content receiver using the content navigation feature described above in relation to FIG. 12 are displayed in the search term field 394. The user has the option of using search filters selected from the filtering options 402 to refine their search results and, in doing so, each selected search filter will be populated alongside the search terms entered by the user. Thus a search modified from the user's initially entered search terms may appear in the form "Search name+$1^{st}$ filter applied+$2^{nd}$ filter applied" and which modified search term is then used to obtain updated search results from a content feed.

The filtering options 402 are arranged as a list of category refinements, e.g. Content Type (such as Music, Movies, User generated content, TV programmes), Quality, Content Provider, Genre, Sort results, Language, User tagged content, and Reset all filters. A number may be displayed against each category refinement and to which a correspondingly numbered key on a remote control of the content receiver will, when pressed, invoke the display of a host of sub-categories related to the selected category to allow the user to further refine the search results.

In the illustrated example of FIG. 13, if the user presses the "6" key for the "Quality" category, the displayed filter list changes to show sub categories such as High Definition (HD), Standard Definition (SD), and both HD and SD. If, for example, the user selects the HD sub-category, an indication is displayed adjacent the "Quality" filtering option on the main category refinements list of filtering options 402 to indicate that there is category refinement under the "Quality" filtering option. The search term field 394 is updated to include "HD" in the modified search term.

The list of content identifier items 396 comprises a vertical list of identifier items relating to content found through the search. As a default, the identifier items are arranged with the most relevant identifier items at the top of the list. The content identifier items provide at least a name of the content (e.g. Title) and serve as links to the content they identify. Thus, if a user selects a particular content identifier item, the content will then be displayed to the user. An input command received by the user input is communicated to the CPU 141 which determines if the requested content is available via the broadcast video distribution network or the communication network. If available via the broadcast video distribution network, the CPU 141 sends a control signal to the distribution receiver 142 to ensure that an appropriate gateway is open (e.g. correct TV channel selected) to receive the content at the content receiver. Additionally, the CPU 141 sends a notification to the content manager 116 of the MDMS 110 via the communications network that such content is being obtained. The content manager 116 communicates with the data storage module of the configuration module 114 to locate appropriate parameters to be applied to the content and, upon location, transfers the same to the content receiver 108 via the communications network. Upon receipt of the content at the distribution receiver 142 of the content receiver 108, the content passes to the video decoder which applies the parameters received from the MDMS 110 to the content.

If the content is available via the communication network, a content request is sent by the CPU 141 via the network interface 146 to the communication network 104 for transmission to the MDMS 110. Upon receipt of the request, the network interface 112 transfers the request to the content manager 116 which acquires location data (e.g. a URL) of the requested content from the content indexer 118 (via the configuration module 114) and returns the location data of the content source via the communications network 104 to the content receiver 108. The CPU 141 upon receipt of the location data then requests the content from a content source using the location data.

Cursor 398 comprises a movable indication feature which highlights one content identifier item in the list of content identifier items 396. The cursor is movable vertically from a first position where a first content identifier item is highlighted to a second adjacent position where a second content identifier item is highlighted responsive to user input via the remote control (e.g. Up/Down keys of the remote control).

When the cursor 398 is located over a content identifier item, the highlighted item may be enlarged (compared with other content identifier items in the list of content identifier items 396) and/or gain a border. Additionally, further information relating to the content may be displayed within the content identifier item (e.g. Quality (HD/SD), Premium Icon (to indicate that payment is required to view the content), age certificate icon, a content owner logo, content length, whether the content is broadcast video or Internet video content, and one line synopsis of content).

The content identifier items may comprise one or more of: image data; video data; and text data. The image data may comprise images and/or icons in a particular format e.g. JPEG.

The cursor 398 may also comprise a directional indicator to indicate to a user that the list can be navigated using Up/Down arrows of the remote control. If the cursor is positioned over the first item in the list only a down indicator should be visible and, likewise, if the cursor is positioned over the last item in the list, only an up indicator should be visible.

The, categories under which the search results were found 400 may include categories such as "Local", "General", "News" and "Adult". A number associated with each category indicates the number of content items found in the search under that particular category. The actual categories displayed may be dynamically determined by the MDMS based on the results listed.

Associated content list 404 comprises a horizontal list arranged below the list of content identifier items 396, and which includes content items associated with the content identifier item currently highlighted in the list of content identifier items 396. The associated content list 404 is a dynamic list which changes as the content identifier item highlighted in the list of content identifier items 396 changes. The content identifier items of the associated content list 404 serve as links to the content they identify. Thus, if a user selects a particular content identifier item, the content will then be displayed to the user.

In the illustrated example, the content identifier items in the associated content list 404 are recommendations based upon the highlighted item in the list of content identifier items 396. Further, the associated content list is, in the illustrated example, in a carousel arrangement.

To access the associated content list 404 from a list of content identifier items 396 a user presses remote control keys having appropriate movement functions assigned thereto (e.g. Left/Right arrow keys) to move focus to the associated content list 404. In a particular arrangement, pressing a Left/Right arrow key once will shift focus to the associated content list 404, the list of content identifier items 396 will fade, the cursor 398 will disappear and the associated content list cursor 405 will appear. Pressing up/down arrow keys will shift focus back to the list of content identifier items 396, the associated content list 404 will fade.

Associated content list cursor 405 only appears when focus is changed to the associated content list in the manner described above. The associated content list cursor 405 comprises a movable indication feature which highlights one associated content identifier item in the associated content list 404. The cursor is movable horizontally from a first position where a first associated content identifier item is highlighted to a second adjacent position where a second associated content identifier item is highlighted responsive to user input via the remote control (e.g. Left/Right keys of the remote control).

When the associated content list cursor 405 is located over a content identifier item, the highlighted item may be enlarged (compared with other associated content identifier items in the associated content list 404) and/or gain a border. As a default option in a particular arrangement, the centre item of the associated content list 404 is the item highlighted by the associated content list cursor 405. Pressing the Left/Right keys rotates the carousel but the highlighted item remains in the centre, i.e. the cursor remains stationary at the centre of the associated content list 404 whilst the items move relative to it.

Additionally, further information relating to the associated content item currently highlighted may be displayed within the associated content identifier item (e.g. a content owner logo, one line synopsis of content).

The associated content list cursor 405 may also comprise a directional indicator to indicate to a user that the list can be navigated using Left/Right arrows of the remote control.

In the illustrated example, the list is arranged in a carousel manner, and so both directions are indicated at all times.

The additional options field 406 presents further functions that can be performed. In the illustrated example screenshot 392 it is indicated that a particular key of the remote control having an appropriate function assigned thereto (e.g. Red key) should be pressed to perform a new search, and a different key of the remote control having an appropriate function assigned thereto (e.g. Green key) should be pressed to allow the user to bookmark the highlighted item in the list. Further options might include the illustrated functions of a rating function (e.g. "Love this") and "Save". The "Love this" function allows a user to rate the highlighted item in the list by pressing a Yellow key of the remote control and the "Save" function allows the user to save the search results by pressing the Blue key of the remote control.

Content items in the list may optionally display a number of relevant focusable content sub-items arranged vertically, for example, options to play SD or HD and to remove the item from the list.

FIG. 14 shows a screenshot 408 of a screen displayed by a favourites feature when invoked by the content receiver in response to instructions input by a user. This feature has similar elements and functions as the feature described in relation to FIG. 13. The feature displays a list of content identifier items 412 comprising links to content. The list of favourites is created by a user and is stored in the data storage module of MDMS 110.

The screen of the favourites feature contains a feature identifier field 410, a list of content identifier items 412, a cursor 414, an associated content list 416, an associated content list cursor 418 and an options field 420.

The type of feature (in this case "favourites") is displayed in the feature identifier field 410.

The list of content identifier items 412 comprises a vertical list of identifier items relating to content in the list of favourites. This is similar to the list 396 of FIG. 13.

Cursor 414 comprises a movable indication feature which highlights one content identifier item in the list of content identifier items 412. The cursor 414 is similar to the cursor 398 of FIG. 13.

Associated content list 416 comprises a horizontal list arranged below the list of content identifier items 412, and which includes content items associated with the content identifier item currently highlighted in the list of content identifier items 412. Again, this list is similar to the list 404 described in relation to FIG. 13.

Associated content list cursor 418 comprises a movable indication feature which highlights one associated content identifier item in the associated content list 416, and is similar to the associated content list cursor 405 described in relation to FIG. 13.

Although FIG. 14 illustrates cursor 414 and associated content list cursor 418 present at the same time, this need not be the case. Indeed, in an optional arrangement, when focus is on the list of content identifier items 412, then only the cursor 414 is displayed. However, when focus changes to the associated content list 416, the cursor 414 disappears and the associated content list cursor 418 appears around an item in the associated content list 416. When focus changes back to the list of content identifier items 412, the cursor 414 reappears and the associated content list cursor 418 disappears.

The additional options field 420 presents further functions that can be performed. In the illustrated example screenshot 392 it is indicated that a particular key of the remote control having an appropriate function assigned thereto (e.g. Red key) should be pressed to perform a search, and a different key of the remote control having an appropriate function assigned thereto (e.g. Green key) should be pressed to allow the user to bookmark the highlighted item in the list. Further options might include the illustrated functions of "Love this" and "Save". The "Love this" function allows a user to rate the highlighted item in the list by pressing a Yellow key of the remote control and the "Save" function allows the user to save the search results by pressing the Blue key of the remote control.

FIG. 15 shows a screenshot 422 of a screen displayed by a TV guide feature when invoked by the content receiver in response to instructions input by a user.

The TV guide screen of the TV guide feature contains an information field 424, a list of TV programme content identifier items 426, a cursor 428, an associated content list 430, an associated content list cursor 432 and an options field 434.

The information field 424 displays, for example, the viewer logged in at the content receiver, a number of the viewer's friends currently online versus a total number of friends, a number of unread messages in the viewer's inbox, and a current date and time.

The list of TV programme content identifier items 426 comprises a vertical list of identifier items relating to content being broadcast in relation to the channel currently being viewed. In a particular example, the current programme is shown along with subsequent programmes on that channel. As will be appreciated, there is no point in showing previous programmes in a linear broadcast environment, unless "catch-up" services are available via the communications network or PVR services since the opportunity to view previous programmes has passed. The content identifier items provide at least a name of the content (e.g. programme title) and serve as links to the content they identify. Thus, if a user selects a particular content identifier item, the content will then be displayed to the user using processes in a similar manner as described above. The content identifier items may further include metadata providing a synopsis of the programme, a content owner logo, an information icon, and a start time (if the programme has not yet started).

Cursor 428 comprises a movable indication or pointer feature which highlights one content identifier item in the list of TV programme content identifier items 426. The cursor 428 is similar to those cursors 398, 414 described in relation to FIGS. 13 and 14 respectively.

Associated content list 430 comprises a horizontal list arranged below the list of TV programme content (or online media content (depending on the configuration)) identifier items 426, and which includes content items associated with the content identifier item currently highlighted in the list of TV programme content identifier items 426. The associated content list 430 is a dynamic list which changes as the content identifier item highlighted in the list of TV programme content identifier items 426 changes. Depending on the configuration (OEM, Operator or Content Owner (broadcaster), the content identifier items could relate to "catch-up" TV items, online content items from one or more pre-defined sources, related broadcast shows or channels from the same broadcaster). The content identifier items of the associated content list 430 serve as links to the content they identify. Thus, if a user selects a particular content identifier item, the content will then be displayed to the user.

In the illustrated example, the content identifier items in the associated content list 430 are recommendations based upon the highlighted item in the list of TV programme content identifier items 426. Further, the associated content list is, in the illustrated example, in a carousel arrangement.

The associated content list 430 can be accessed from a list of TV programme content identifier items 426 in a similar manner to that described above in relation to FIG. 13.

Associated content list cursor 432 comprises a movable indication feature which highlights one associated content identifier item in the associated content list 430 and is similar to the associated content list cursor 405, 418 described in relation to FIGS. 13 and 14 respectively.

Although FIG. 15 illustrates cursor 428 and associated content list cursor 432 present at the same time, this need not be the case. This is in a similar manner to that described in relation to FIG. 14.

The additional options field 434 presents further functions that can be performed. In the illustrated example screenshot it is indicated that a particular key of the remote control having an appropriate function assigned thereto (e.g. Red key) should be pressed to perform a search.

The particular functions available (for example, "record", "bookmark", "share" or "download"), will depend on the device's capabilities and the OEM, operator or content owner preferences.

Although described in relation to a TV programme guide, the arrangement of FIG. 15 may also be applicable as a content guide for content received via the communications network rather than broadcast content.

The above one or more embodiments are to be understood as illustrative examples of the invention. Further embodiments of the invention are envisaged as follows.

In one or more embodiments of the invention content distribution is via transmission over both a communications network (as either streaming video or as a progressive download) and a video distribution network (as broadcast video). The communications network may be for example the Internet or a local private network, a wireless network, or a telecommunications network such as for example General Packet Radio Service (GPRS) or a telecommunications network based on a Third Generation (3G) telecommunications standard such as for example the Universal Mobile Telecommunications System (UMTS) or Code Division Multiple Access 2000 (CDMA2000) and the distribution receiver receives the transmission via a communications network, for example a network card, or a broadband modem, or a wireless network card, or a telecommunications receiver such as a GPRS receiver or a receiver based on a Third Generation (3G) telecommunications standard such as for example the Universal Mobile Telecommunications System (UTMS) or Code Division Multiple Access 2000 (CDMA2000).

In one or more embodiments of the invention content distribution technique may be via a storage medium for example a hard disc, or an optical storage medium such as a Digital Versatile Disc (DVD) or a High Definition DVD (HD-DVD) such as a Blue Ray Disc, and the content receiver is a device for accessing the storage medium, such as a hard disc or a DVD player or an HD-DVD player.

In one or more embodiments of the invention content distribution may be via a user-recorded storage medium, such as a hard disc or a Video Home System (VHS) cassette or for example an optical storage medium such as a Digital Versatile Disc (DVD) or a High Definition DVD (HD-DVD) such as a Blue Ray Disc, and the content receiver is a device for accessing the user recorded storage medium, such as means for accessing a hard disc or a VHS cassette player or a DVD player or an HD-DVD player.

In one or more embodiments of the invention content distribution may be via a user-recorded storage medium that is internal to the content receiver.

In one or more embodiments of the invention content distribution may be via a user-recorded storage medium that is external to and coupled with the content receiver.

In one or more embodiments of the invention content distribution may be via a user-recorded storage medium at a remote location and includes transmission to the content receiver via a communications network such as for example the Internet.

In one or more embodiments of the invention content distribution may be via an analogue broadcast.

In one or more embodiments of the invention content distribution may be via a digital broadcast.

In one or more embodiments of the invention content distribution may be via terrestrial television broadcast and the content receiver is a terrestrial television receiver.

In one or more embodiments of the invention content distribution may be via satellite television broadcast and the content receiver is a satellite television receiver.

In one or more embodiments of the invention content distribution may be via cable television broadcast and the content receiver is a cable television receiver.

In one or more embodiments of the invention, the content receiver may be configured to specify its capabilities to the MDMS, for example, each time search request is invoked, and/or when a request for content is sent to the MDMS.

In one or more embodiments of the invention the content receiver may be a computer, or content stored on a computer on a home network.

In one or more embodiments of the invention the content receiver may be a mobile device such as for example a portable computer, a mobile phone or another receiver of Digital Video Broadcast for Handheld devices (DVB-H).

In one or more embodiments of the invention the content display may be a visual display unit such as a computer monitor.

In one or more embodiments of the invention the content display may be a screen embedded in a mobile device.

In one or more embodiments of the invention the content navigation feature may be invoked via the user selection of a menu item displayed by the video receiver.

In one or more embodiments of the invention the content navigation feature and the browser application may be components of a single computer program.

In one or more embodiments of the invention the content navigation feature may be implemented as dynamically generated content presented by the content receiver, for example where the dynamically generated content is a web page in a markup language such as for example Hypertext Markup Language (HTML).

In one or more embodiments of the invention the content navigation feature may be implemented as dynamically generated content presented by the browser application that is generated by a remote system and transmitted to the browser application via a communications network.

In one or more embodiments of the invention the content receiver may be able to render items of content relating to TV applications described in a markup language or other Interactive engine such as for example Hypertext Markup Language (HTML), TV Markup Language (TVML, or wTVML), Extensible HTML (XHTML), XHTML Basic, CE-HTML or another Extensible Markup Language (XML) based content description.

In one or more embodiments of the invention the browser application may be able to render content in the form of a video sequence such as for example a video received via a communications network or a video distributed via a broadcast method received by the content receiver or a video stored on a storage medium accessed by the content receiver.

In one or more embodiments of the invention the search function comprises a sub-image embedded in content.

In one or more embodiments of the invention the input device may be a keypad on a mobile device, for example a keypad on a mobile phone.

In one or more embodiments of the invention the link to content may be a Universal Resource Identifier (URI).

In one or more embodiments of the invention the link to content may direct the content receiver to access content that is for example a video sequence that is for example received via a communications network or distributed via a broadcast method or stored on a storage medium, or a TV application capable of being accessed via an interactive content engine installed on the device.

In one or more embodiments of the invention, the links to content may be paid-for interactive or video advertisements.

In one or more embodiments of the invention the content output component may be able to present a video sequence decoded by the video decoder in one portion of the video display and graphics produced by programs running on the graphics processor in another portion of the display.

In one or more embodiments of the invention the content output component may be able to present graphics produced by programs running on the graphics processor that consume the entire display.

In one or more embodiments of the invention the content output component produces an analogue computer display signal such as a Video Graphics Array (VGA) signal.

In one or more embodiments of the invention the video output component produces a digital display signal such as a Digital Visual Interface (DVI) signal.

In one or more embodiments of the invention the video output component produces a high-definition digital display signal such as a High-Definition Multimedia Interface (HDMI) signal.

It will be appreciated that the term "playback" is intended to refer to the display of live video content such as a live sporting event as well as recorded video content.

It is to be understood that any feature described in relation to any one embodiment may be used alone, or in combination with other features described, and may also be used in combination with one or more features of any other of the embodiments, or any combination of any other of the embodiments.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analogue media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory. The computer program may be supplied from a remote source embodied in the communications medium such as an electronic signal, radio frequency carrier wave or optical carrier waves. Such carrier media are also envisaged as aspects of the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A method for operating a data processing apparatus to backup display of a sequence of interrupted content items through a module of the data processing apparatus using a CPU and a software program, comprising:

identifying a series of user invoked interruptions, each interruption comprising a transition between the display of a first content item and the display of a second content item, wherein the first content item and the second content item are in a sequence of at least three interrupted content items and the sequence of interrupted content items include content items from at least two different content domains;

storing, at the data processing apparatus, interruption records each including a locator to a said first content item subject to a corresponding user invoked interruption, and further including a record of the order in which said interruptions occurred; and initiating display in a last in first out order of the sequence of interrupted content items responsive to a sequence of backup signals, such that each of the sequence of backup signals causes display of a previous interrupted content item of the sequence of at least three interrupted content items.

2. A method according to claim 1, further comprising responding to a selection of a one of said one or more content item identifiers and initiating display of a said first content item corresponding to said selection.

3. A method according to claim 2, wherein said one or more content item identifiers include one or more graphic items.

4. A method according to claim 3, wherein said graphic item or said one or more graphic items comprise a still image.

5. A method according to claim 3, wherein said graphic item or said one or more graphic items comprise a video clip.

6. A method according to claim 5, further comprising initiating restarting display of the said first content item responsive to said backup signal.

7. A method according to claim 5, further comprising initiating resuming display of said first content item responsive to said backup signal.

8. A method according to claim 1, wherein said first content item is a broadcast content item said method further comprising maintaining receiving said first content item and initiating recording said first content item responsive to said user invoked interruption.

9. A method according claim 8, further comprising including in an interruption record for a broadcast said first content item program status information in the said first content item.

10. A method according to claim 9, wherein said program status information signal is a commercial break information signal indicative of an end of a commercial break.

11. A method according to claim 9, wherein said program status information is indicative of a return to a position in said first content item comprising content of a type present prior to said corresponding said interruption.

12. A method according to claim 11, further comprising initiating display of the said first content item from a position determined by said program status.

13. A method according to claim 12, further comprising providing an option to select initiating display from said position or from the beginning of the said first content item.

14. A method according to claim 13, further comprising initiating display of said option.

15. A method according to claim 8, wherein said user invoked interruption comprises a channel change signal or a request to view a broadband content item.

16. A method according to claim 15, wherein at least one of said content items is a part of a sequence of content items.

* * * * *